US012658178B2

(12) United States Patent (10) Patent No.: US 12,658,178 B2
Parada et al. (45) Date of Patent: Jun. 16, 2026

(54) METHOD FOR PERSONALIZATION OF ASR MODELS

(71) Applicant: Samsung Electronics Co., Ltd., Suwon-si (KR)

(72) Inventors: Pablo Peso Parada, Chertsey (GB); Mete Ozay, Chertsey (GB); Karthikeyan Saravanan, Chertsey (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 290 days.

(21) Appl. No.: 18/587,238

(22) Filed: Feb. 26, 2024

(65) Prior Publication Data

US 2025/0006183 A1      Jan. 2, 2025

(30) Foreign Application Priority Data

Feb. 28, 2023      (GB) ...................................... 2302913
Jun. 23, 2023      (GB) ...................................... 2309497

(51) Int. Cl.
G10L 15/07         (2013.01)
G10L 15/02         (2006.01)
(Continued)

(52) U.S. Cl.
CPC ............ G10L 15/075 (2013.01); G10L 15/02 (2013.01); G10L 15/04 (2013.01); G10L 15/063 (2013.01);
(Continued)

(58) Field of Classification Search
CPC ....... G10L 15/075; G10L 15/02; G10L 15/04; G10L 15/063; G10L 15/07;
(Continued)

(56) References Cited

U.S. PATENT DOCUMENTS 7,346,507 B1 *    3/2008   Natarajan ............. G10L 15/063
                                                                         379/88.07
7,533,019 B1 *    5/2009   Hakkani-Tur .......... G10L 15/26
                                                                            704/255
(Continued)

FOREIGN PATENT DOCUMENTS

KR      10-2022-0053475 A      4/2022
WO          2021/162536 A1      8/2021

OTHER PUBLICATIONS

Algolia; Voice search: the latest statistics and trends for 2022 and beyong; https://www.algolia.com/blog/product/voice-search-the-latest-statistics-andtrends-for-2022-and-beyond/; Mar. 2, 2023.
(Continued)

*Primary Examiner* — Thuykhanh Le

(74) *Attorney, Agent, or Firm* — Jefferson IP Law, LLP

(57) ABSTRACT

The disclosure generally relate to a method performed by a user device obtaining a pre-trained automatic speech recognition (ASR) model, obtaining a user data from a user database, analysing a distribution of the user data with respect to an acoustic characteristic, determining, using the distribution, whether data augmentation for the acoustic characteristic is to be applied, when it is determined that data augmentation is to be applied, dividing the user data into a training subset and a validation subset, based on an acoustic characteristic being less audible in the training subset than in the validation subset, applying data augmentation to add the acoustic characteristic to the user data in the training subset, and updating the pre-trained ASR model with the augmented training subset to generate a personalised local ML model.

20 Claims, 15 Drawing Sheets

(51) Int. Cl.

| | |
|---|---|
| *G10L 15/04* | (2013.01) |
| *G10L 15/06* | (2013.01) |
| *G10L 15/18* | (2013.01) |
| *G10L 15/22* | (2006.01) |
| *G10L 15/30* | (2013.01) |
| *G10L 21/028* | (2013.01) |

(52) U.S. Cl.
CPC .......... *G10L 15/07* (2013.01); *G10L 15/1815* (2013.01); *G10L 15/22* (2013.01); *G10L 15/30* (2013.01); *G10L 21/028* (2013.01); *G10L 2015/223* (2013.01)

(58) Field of Classification Search
CPC ..... G10L 15/1815; G10L 15/22; G10L 15/30; G10L 21/028; G10L 2015/223; G10L 21/00; G10L 21/02
USPC ........................................................ 704/243
See application file for complete search history.

(56) References Cited

U.S. PATENT DOCUMENTS

| | | | | |
|---|---|---|---|---|
| 8,135,589 | B1 * | 3/2012 | Reding | G10L 15/30 704/231 |
| 8,682,669 | B2 * | 3/2014 | Suendermann | G10L 15/063 704/275 |
| 10,102,849 | B2 * | 10/2018 | Vozila | G10L 15/063 |
| 11,593,588 | B2 | 2/2023 | Kim et al. | |
| 11,694,694 | B2 * | 7/2023 | Traynor | G10L 17/26 704/243 |
| 12,062,369 | B2 * | 8/2024 | Kupryjanow | G10L 15/20 |
| 12,142,298 | B1 * | 11/2024 | Kottur | G06F 40/35 |
| 12,190,877 | B1 * | 1/2025 | Barber | G10L 15/22 |
| 12,340,793 | B1 * | 6/2025 | Ljolje | G10L 21/007 |
| 2002/0065656 | A1 * | 5/2002 | Reding | G10L 15/30 704/E15.047 |
| 2002/0065657 | A1 * | 5/2002 | Reding | G10L 13/08 704/E15.047 |
| 2007/0233487 | A1 * | 10/2007 | Cohen | G10L 15/063 704/255 |
| 2007/0299664 | A1 * | 12/2007 | Peters | G06F 40/16 704/235 |
| 2010/0268536 | A1 * | 10/2010 | Suendermann | G10L 15/22 704/E15.008 |
| 2016/0203817 | A1 * | 7/2016 | Formhals | H04M 3/5116 379/45 |
| 2017/0040016 | A1 * | 2/2017 | Cui | G10L 15/02 |
| 2018/0090131 | A1 * | 3/2018 | Mangalath | G10L 15/142 |
| 2018/0350348 | A1 * | 12/2018 | Fukuda | G10L 21/003 |
| 2019/0034826 | A1 * | 1/2019 | Ahmad | G06N 20/00 |
| 2019/0130896 | A1 * | 5/2019 | Zhou | G10L 15/063 |
| 2019/0304480 | A1 * | 10/2019 | Narayanan | G10L 13/02 |
| 2020/0005766 | A1 * | 1/2020 | Kim | G10L 15/02 |
| 2020/0105262 | A1 * | 4/2020 | Abhinav | G10L 15/25 |
| 2020/0327884 | A1 * | 10/2020 | Bui | G10L 15/16 |
| 2020/0335086 | A1 * | 10/2020 | Paraskevopoulos | G06N 3/088 |
| 2021/0035563 | A1 * | 2/2021 | Cartwright | G06N 3/084 |
| 2021/0043186 | A1 * | 2/2021 | Nagano | G10L 15/063 |
| 2021/0287660 | A1 * | 9/2021 | Sharma | G06N 20/00 |
| 2021/0304737 | A1 * | 9/2021 | Han | G10L 15/26 |
| 2022/0189461 | A1 * | 6/2022 | Zhao | G10L 15/063 |
| 2022/0189463 | A1 | 6/2022 | Oh et al. | |
| 2022/0246132 | A1 * | 8/2022 | Zhang | G06N 3/09 |
| 2022/0335937 | A1 | 10/2022 | Thomas et al. | |
| 2022/0392432 | A1 * | 12/2022 | Alphonso | G10L 15/01 |
| 2023/0033768 | A1 * | 2/2023 | Chong | G10L 15/063 |
| 2023/0056955 | A1 | 2/2023 | Yao et al. | |
| 2023/0061505 | A1 * | 3/2023 | Oh | G10L 15/063 |
| 2023/0067305 | A1 * | 3/2023 | Assa | G06F 3/167 |
| 2023/0107493 | A1 * | 4/2023 | Bijwadia | G06N 3/0442 704/270 |
| 2023/0116052 | A1 * | 4/2023 | Eskimez | G10L 21/0208 704/223 |
| 2023/0146945 | A1 * | 5/2023 | Lai | G10L 13/00 704/243 |
| 2023/0197064 | A1 * | 6/2023 | Bekker | G06N 3/08 704/200 |
| 2024/0055012 | A1 * | 2/2024 | Wang | G10L 25/30 |
| 2025/0259641 | A1 * | 8/2025 | de la Rey | G10L 21/0272 |
| 2025/0329268 | A1 * | 10/2025 | Ji | G10L 13/02 |

OTHER PUBLICATIONS

Graves et al.; Connectionist temporal classification: Labelling unsegmented sequence data with recurrent neural networks; 2006.

fireflies.ai; 15 Uses of Voice Recognition Software Today; https://fireflies.ai/blog/uses-of-voice-recognition-software; Jan. 20, 2020.

Lenzen; Motherjones; Hey Siri—Why Don't You Understand More People Like Me?; https://www.motherjones.com/media/2021/02/digital-assistants-accents-englishrace-google-siri-alexa/; Feb. 23, 2021.

Enge; Perficient; https://www.perficient.com/insights/research-hub/voice-usage-trends; Jun. 30, 2020.

Kim et al.; Improved Vocal Tract Length Perturbation for a State-of-the-Art End-to-End Speech Recognition System; ResearchGate; Interspeech 2019; Sep. 15-19, 2019; Graz, Austria.

Lam et al.; On-the-Fly Aligned Data Augmentation for Sequence-to-Sequence ASR; Jun. 9, 2021.

Ko et al.; A study on data augmentation of reverberant speech for robust speech recognition; 2017.

Harwell; The Accent Gap; The Washington Post; https://www.washingtonpost.com/graphics/2018/business/alexa-does-not-understand-your-accent/; Jul. 19, 2018.

* cited by examiner

METHOD FOR PERSONALIZATION OF ASR MODELS

CROSS-REFERENCE TO RELATED APPLICATION(S)

This application is based on and claims priority under 35 U.S.C. § 119 (e) of a United Kingdom patent application number 2302913.5, filed on Feb. 28, 2023, in the United Kingdom Intellectual Property Office, and of a United Kingdom patent application number 2309497.2, filed on Jun. 23, 2023, in the United Kingdom Intellectual Property Office, the disclosure of each of which is incorporated by reference herein in its entirety.

TECHNICAL FIELD

The disclosure generally relates to a method for personalisation of machine learning, ML, models, for example an automatic speech recognition (ASR) model. In particular, the disclosure relates to a computer-implemented method for using data augmentation in the personalization process.

BACKGROUND ART

End-to-end (E2E) Automatic Speech Recognition (ASR) models achieve state-of-the-art results when trained with thousands of hours of speech data from multiple users. However, one of the challenges of on-device deployment of these ASR models arises from the mismatch between training and test conditions. These models suffer from performance degradation due to the speech variability or different acoustic environments (such as additive noise or reverberation) of the target user.

Personalization of ASR models aims at reducing this performance gap by leveraging limited user data. A variety of techniques have been employed to boost the personalization task, such as contextual biasing, embedding based adaptation or feature transformation adaptation. Separately to personalization, data augmentation (DA) may be used in training of Automatic Speech Recognition (ASR) models. Data augmentation offers increased data variability, robustness and generalization against different acoustic distortions. Several data augmentation methods have been proposed to improve ASR performance, for example one method optimizes a data augmentation policy by randomly searching over large augmentation space. However, techniques proposed for using personalized data augmentation (DA) in ASR tasks have been scarce.

FIG. 1 is a flowchart illustrating a typical ASR model personalization pipeline. In a first step S100, the server obtains a model to be trained, for example a conformer ASR and in a second step S102, the server obtains a supervised dataset for training the model. Although these steps are shown sequentially, it will be appreciated that they may be done simultaneously. At step S104, the obtained model is trained and optimised to generate a trained ASR model which is then sent to a user device at step S106. As indicated by the dashed line, there may be a training loop in which the steps S102 to S106 are repeated by the server.

The user device receives the trained model and at step S108 obtains user data, typically from an on-device dataset for data security reasons. At step S110, the user data is augmented, for example using on the fly data augmentation. The received model is then trained at step S112 with the augmented user data. A personalised and updated model may then be stored at step S114 on the user device. As indicated by the dashed line, there may be a training loop in which the steps S110 to S114 are repeated by the user device. Such on the fly data augmentation means that the model created with the augmented data typically does not subsequently perform well for the user of the user device.

Therefore, the need for improvements in personalisation of AI models is recognised when using data augmentation, particularly in automatic speech recognition, ASR, models.

SUMMARY

In a first aspect of the disclosure, there is provided a method, performed by a user device, for generating a local machine learning (ML) model which is personalised to a user of the user device, the method comprising: obtaining a pre-trained automatic speech recognition (ASR) model; obtaining a user data from a user database; analysing a distribution of the user data with respect to an acoustic characteristic; determining using the distribution, whether data augmentation for the acoustic characteristic is to be applied, when it is determined that data augmentation is to be applied, dividing the user data into a training subset and a validation subset, based on an acoustic characteristic being less audible in the training subset than in the validation subset; applying data augmentation to add the acoustic characteristic to the user data in the training subset; and updating the pre-trained ASR model with the augmented training subset to generate a personalised local ML model.

In a second aspect of the disclosure, there is provided a user device comprising: a memory storing one or more instructions; and at least one processor configured to execute the one or more instructions to: obtain a pre-trained automatic speech recognition (ASR) model; obtain a user data from a user database; analyse a distribution of the user data with respect to an acoustic characteristic; determine, using the distribution, whether data augmentation for the acoustic characteristic is to be applied; when it is determined that data augmentation is to be applied, divide the user data into a training subset and a validation subset, based on an acoustic characteristic being less audible in the training subset than in the validation subset; apply data augmentation to add the acoustic characteristic to the user data in the training subset; and update the pre-trained ASR model with the augmented training subset to generate a personalised local ML model.

In a third aspect of the disclosure, there is provided a non-transitory data carrier carrying code which, when implemented on a processor of a user device, causes the user device to carry out the method.

BRIEF DESCRIPTION OF THE DRAWINGS

Implementations of the disclosure will now be described, by way of example only, with reference to the accompanying drawings, in which.

DETAILED DESCRIPTION

Broadly speaking, the disclosure generally relate to a computer-implemented method for personalising general-purpose models using personalised data augmentation. The model may be automatic speech recognition (ASR) which involves the recognition and translation of spoken language into text by computers. Other examples of speech technologies which use a speech/audio model which has been trained with speech/audio data include for example speaker verification (SV), speaker identification (SI), keyword spotting (KWS), speech enhancement, speaker diarization, speech translation, sound source separation and audio event detection. As explained in more detail below, user data is analysed to determine whether or not to apply data augmentation during the training of the model and thus the data augmentation technique(s) which are used are personalised to the user. Personalised settings may be used to further personalise the data augmentation techniques which are applied. Finally, the data augmentation which is to be applied may be generated from the user data itself.

Figure 2:
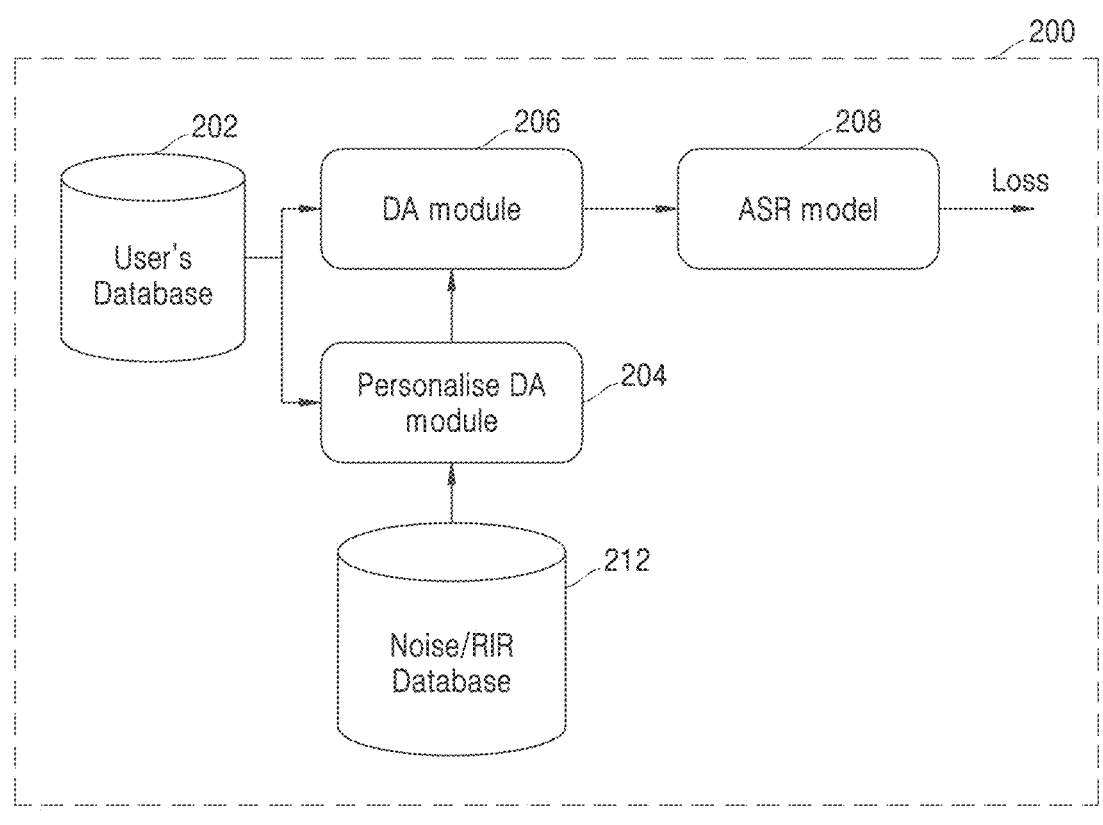
FIG. 2 is a schematic framework for personalisation of a general model to a user device using data augmentation according to and embodiment of the disclosure.

FIG. 2 is a schematic illustration of the framework according to an embodiment of the disclosure. The user device 200 may comprise a user database 202, for example a set of recordings stored on the user device and an augmentation database 212 comprising personalised augmentation information, e.g. noise and/or reverberation information or signals, which can be added to the user data to augment the data as explained in more detail below. The augmentation database 212 may be stored on the user device 200 or may be remote from the user device. The most common distortions present in speech recordings are additive noise due to the presence of background sound sources, and reverberation due to the fact of generating speech in an enclosed space. Personalised examples of these distortions are stored in the augmentation database 212 as explained in more detail below.

This user data has a data distribution p and the personalise data augmentation module 204 extracts information about the data distribution, e.g. the noise and/or reverberation which is available within the set of possible values within the distribution (i.e. within the support σ(p)), to guide the personalized data augmentation. The method of personalized data augmentation may be termed persoDA. This enables adaptation of the ASR model to acoustic conditions observed in a user's recordings. More precisely, this problem can be formulated as optimizing data augmentation parameters θ that maximize the probability of generating similar acoustic environments by $$\arg\max_{\theta} P(\theta|E) \qquad \text{Equation 1}$$

where E denotes the acoustic environment characteristics observed in the data.

The user data may be characterised by more than one distribution, including for example a distribution of user acoustic characteristics p(spk) and a distribution of semantic and syntactic characteristics p (s) as well as the distribution of acoustic environment characteristics p(env). For example, the distribution of user acoustic characteristics may include how fast the user speaks or the spectral characteristics of speech production. The distribution of semantic and syntactic characteristics may include meaning and structure of the text uttered by the user. The distribution of acoustic environment characteristics may for example relate to whether the user is in a reverberant room, inside a car or on the street. The problem can thus be formulated as optimizing data augmentation parameters θ that maximize the probability of generating similar acoustic characteristics in the user data:

$$\arg\max_{\theta} P(\theta|spk, s, env) \qquad \text{Equation 2}$$

where spk denotes the user acoustic characteristics observed in the data, s denotes the semantic and syntactic characteristics observed in the data and env denotes the acoustic environment characteristics observed in the data.

The user's dataset $\mathcal{A}$ is split into two mutually exclusive subsets; a first subset for validation $\mathcal{V}$ and a second subset for training $\mathcal{T}$. Note that $\mathcal{A} = \mathcal{T} \cup \mathcal{V}$. For example, when considering the environment characteristics, the first subset $\mathcal{V}$ contains recordings with high levels of acoustic distortions (such as noise or reverberation) and the second subset $\mathcal{T}$ contains recordings with low level of distortions. The terms high and low are used to indicate the relative levels of the distortion within the two subsets. A distortion threshold may be used to separate the dataset into the two subsets. The second subset $\mathcal{T}$ is used as training samples used for model personalization. The augmentation parameters θ are selected by the personalise DA module 204. The selected data augmentation is then applied only to the second subset $\mathcal{T}$ in the DA module 206. The ASR model 208 is then trained with the augmented data to minimise the output loss. $\mathcal{V}$ is the validation set used to optimize the augmentation parameters θ. The aim is to optimise the set of augmentation parameters θ such that the augmented data is similar to the recorded data on the user device. This optimization problem can be solved using optimization algorithms, classical machine learning methods such as maximum likelihood estimators and deep learning methods.

Figure 1:
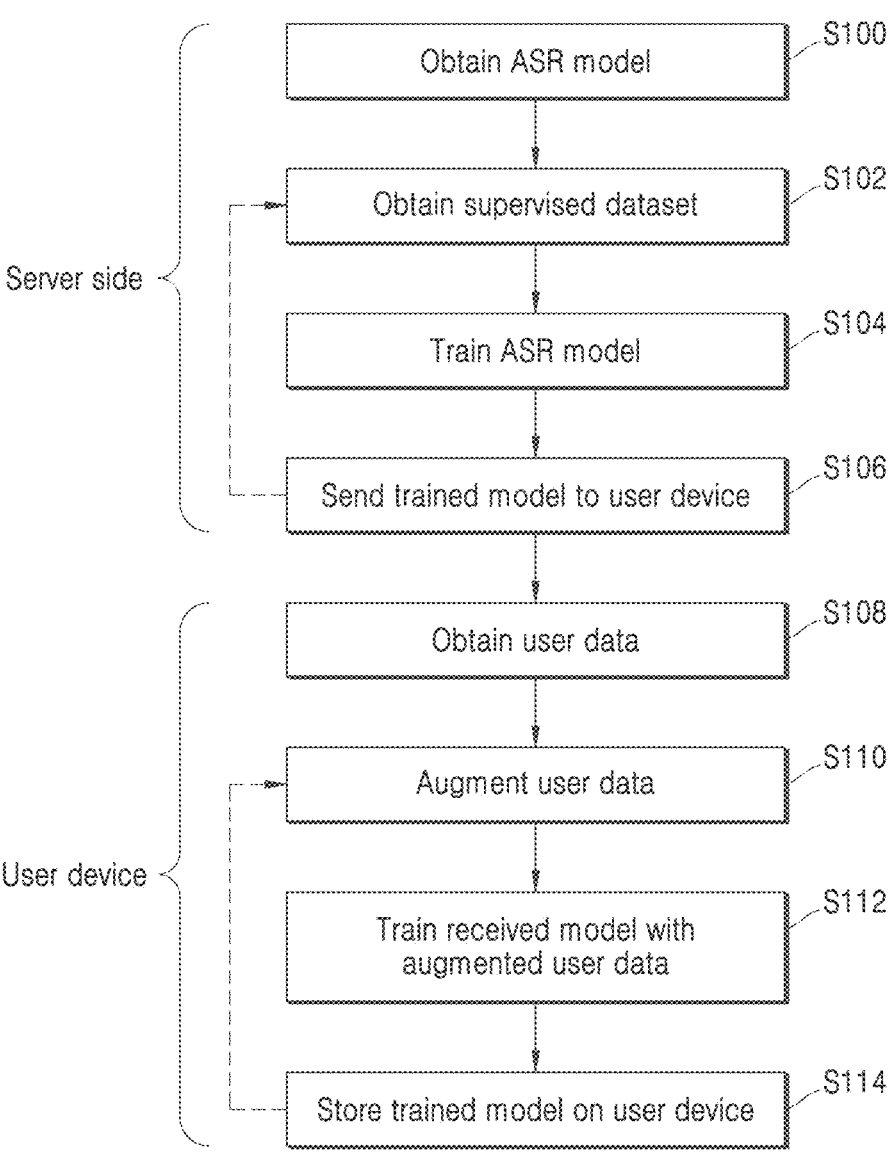
FIG. 1 is a flowchart showing a known method of personalising a general model to a user device using data augmentation.
Figure 3:
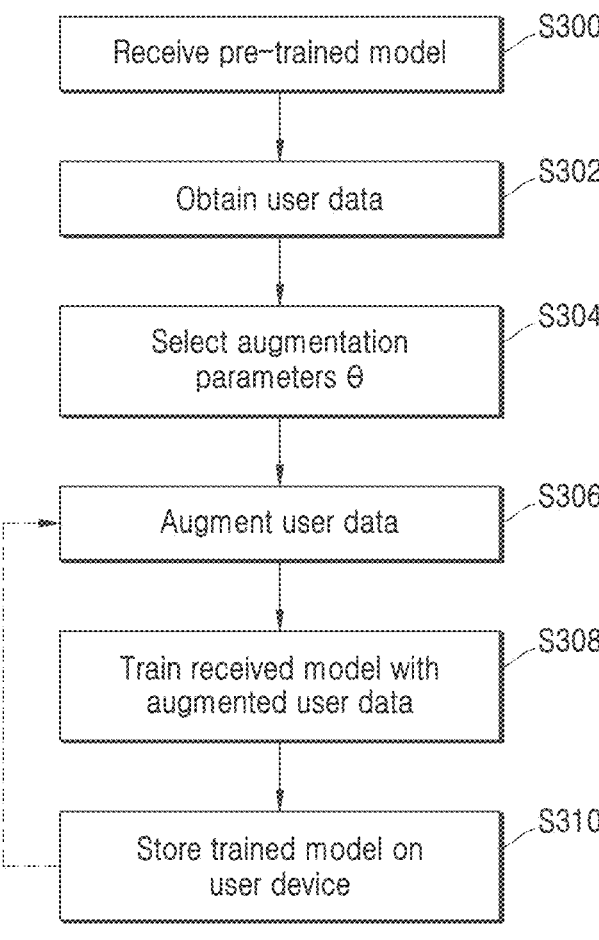
FIG. 3 is a flowchart for implementing the personalisation on the framework shown in FIG. 2.

FIG. 3 illustrates the steps which are carried out by the user device. In a first step S300, the user device receives a pre-trained or general purpose model. Such a general-purpose model can be trained centrally at the server side at full precision, for example as illustrated in step S100 to S108 in FIG. 1. The general-purpose model may be any speech model which receives raw speech data as an input and outputs an embedded representation of the input speech data. Such models can be used for many tasks such as ASR, keyword spotting and spoken-language understanding. The general-purpose model is a neural network comprising a plurality of layers (1, . . . , N) and $W_l$ may be the set of weights or parameters for each layer l. The models may be any type of neural network, including for example convolution neural networks (CNNs) or transformers. The layers may thus be any type of layer, including for example convolutional, linear or transformer layers.

The next step S302 is to obtain the user data, e.g. from the user database. The augmentation parameters θ are selected at step S304, for example using the validation data subset of the user data as explained above or as explained in more detail below. Based on this selection, the subset of the user data which is to be used to train the received model is then augmented at step S306. The received model is then retrained or updated at step S308 with the augmented user data to generate a personalised model which is personalised to the user. Any suitable technique for training/retraining the model may be used. For example, when the model is a neural network comprising a plurality of layers (1, . . . , N), the training will generate a personalised set of weights $w_1$ or parameters for each layer l. In this way, the general purpose model is personalised for a user device for a corresponding user (or speaker—the terms can be used interchangeably). The personalisation is performed using a relatively small dataset of unlabelled private user samples which as shown in FIG. 2 may be stored in a database on the user device as shown or may be stored remotely. The use of unlabelled data helps to preserve the privacy of the user when personalising the model.

Each personalised model may be used by the user for on-device inference, e.g. in voice assistant systems such as Bixby™. The personalised model is stored locally on the user device at step S310 and hence used locally. The proposed method personalises the general-purpose model to generate a model which performs better for the targeted final user.

Figure 4:
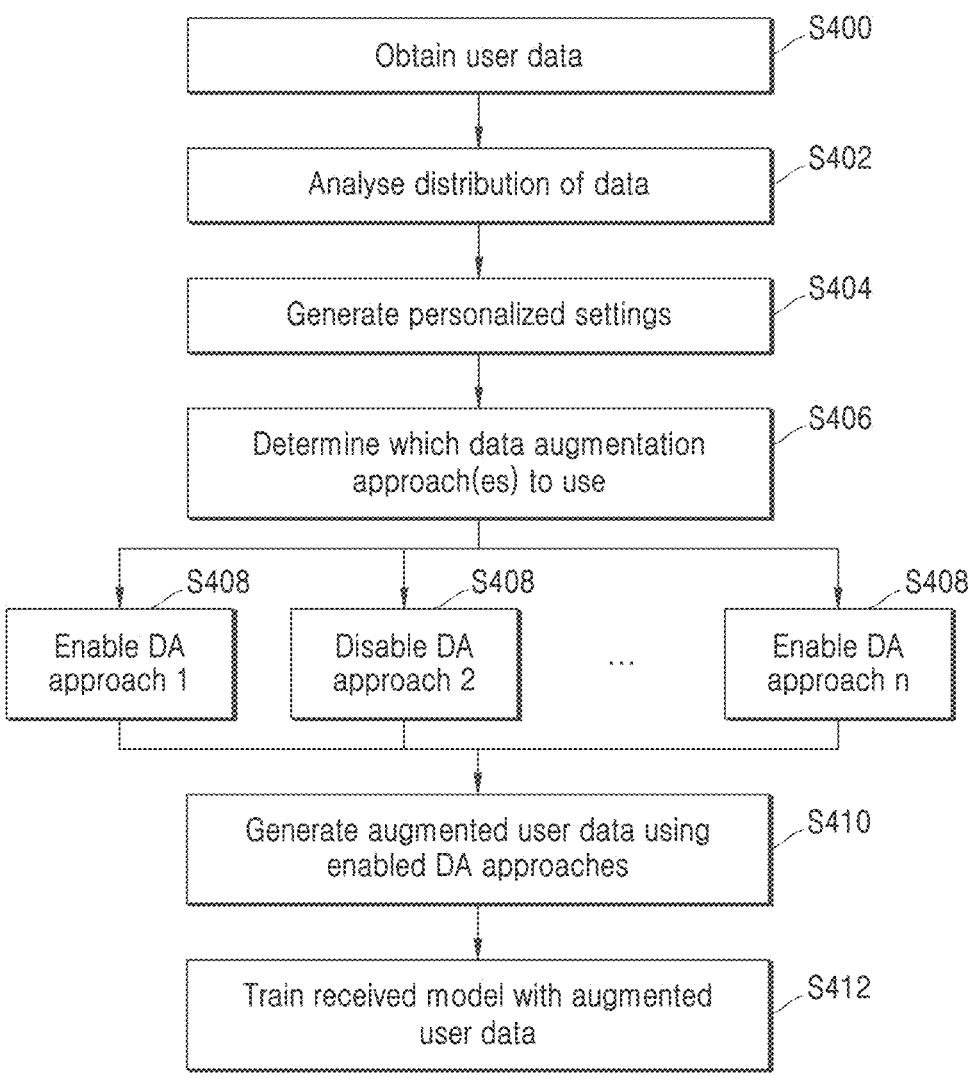
FIG. 4 is a flowchart for a method of implementing the personalisation for FIG. 3 by enabling personalized selection of different data augmentation techniques.

FIG. 4 shows one method for implementing the personalisation of the model by enabling personalized selection of different data augmentation techniques (DA1, DA2, . . . , DAn). Each data augmentation technique may tackle a different problem, for example environment characteristics such as noise and/or reverberation; user acoustic characteristics and/or semantic and syntactic characteristics. A first example of data augmentation techniques is vocal tract perturbation (VTLP) which is described for example in "Improved Vocal Tract Length Perturbation for a State-of-the-Art End-to End Speech Recognition System" by Kim et al. published in Interspeech 2019 incorporated by reference and which transforms the data such that the speaker vocal tract length is shorter or longer. This data augmentation technique relates to user acoustic characteristics. Another example of data augmentation techniques is aligned data augmentation (AD) which is described in "On-the-fly Aligned Data Augmentation for Sequence-to-Sequence ASR" by Lam et al. published in Interspeech 2021 incorporated by reference and which merges two audio files to create new semantic and syntactic context. This data augmentation technique relates to semantic and syntactic characteristics. Another example of data augmentation techniques is multi-condition training (MCT) which is described in "A study on data augmentation of reverberant speech for robust speech recognition" by Ko et al. published in ICASSP 2017 incorporated by reference and which adds reverberation and noise to the audio data to recreate different acoustic spaces like a living room or inside a car. This data augmentation technique relates to the acoustic environment characteristics.

As shown in a first step S400, the user data is obtained and then analysed at step S402. The analysis includes analysing the distribution of the data with respect to the or each acoustic characteristic. A set of personalised settings is then generated at step S404 and these personalised settings (or other data and parameters determined when analysing the user data) are used to determine which of the multiple data augmentation approaches are to be used at step S406. Flags to enable or disable each data augmentation approach are then applied so that at step S408, at least one approach is enabled and optionally at least one approach is disabled. In this example, data augmentation approaches 1 and n are enabled and data augmentation approach 2 is disabled. It will be appreciated that this is just illustrative and different combinations of data augmentation approaches can be used depending on the analysis in step S402.

The augmented user data is then generated at step S410 using the enabled approaches. The data augmentation approaches are typically executed in parallel when generating the augmented data. This augmented user data is used to retrain the original ASR model (e.g. the model received from the server) at step S412.

Merely as an example, consider a user who mostly uses a voice assistant, e.g. Bixby™ in a car. The goal of the local ML model is to improve the transcription performance in a car environment. The personalisation of the model may be achieved by taking the user samples which are not from a car environment, e.g. other queries to the voice assistant. The augmentation process may be personalised by augmenting these samples so that they resemble the target environment, in this case, the user's car environment. The training is then performed on-device with the augmented data which is personalised to the user.

Figure 5:
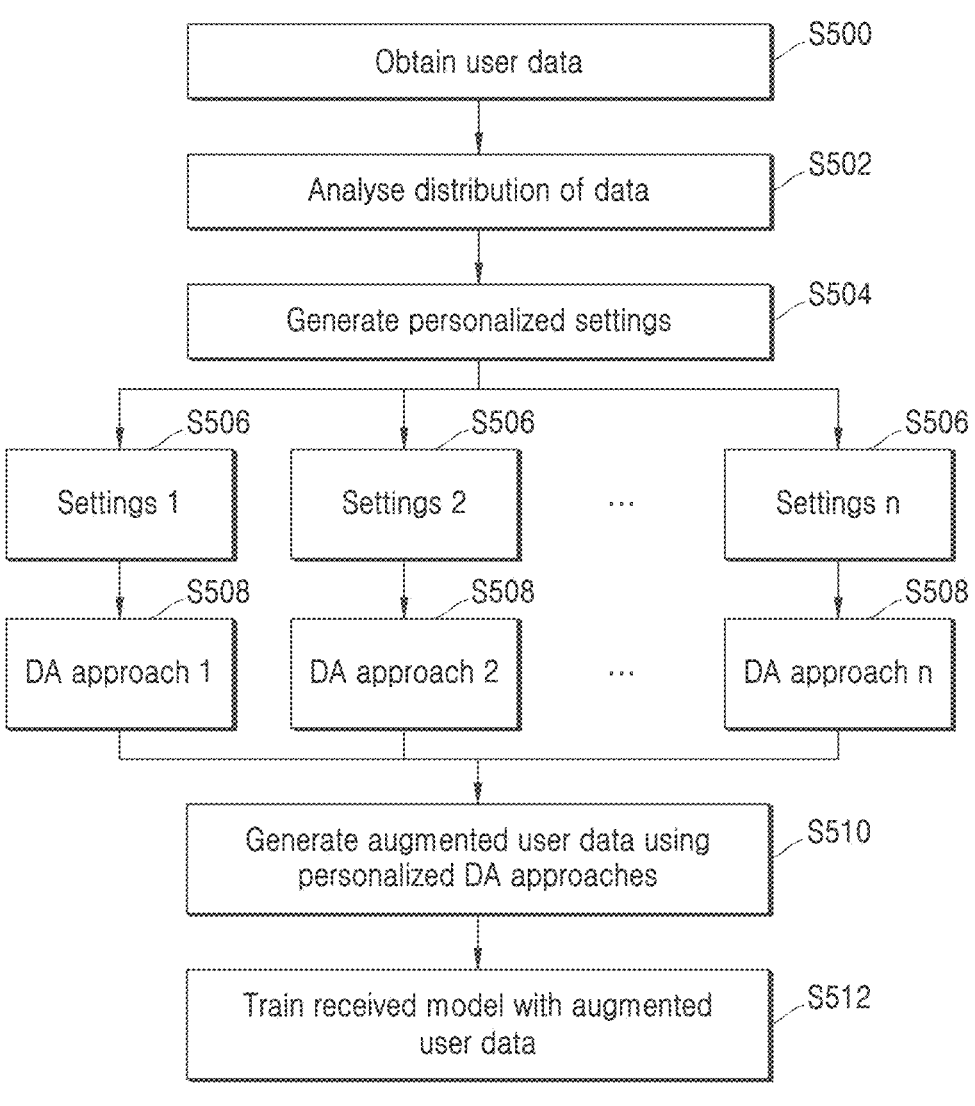
FIG. 5 is a flowchart for a method of implementing the personalisation for FIG. 3 by generating personalized settings for each of the different data augmentation techniques.

FIG. 5 shows another method for implementing the personalisation of the model by generating personalized settings for each of the different data augmentation techniques (DA1, DA2, . . . , DAn). As in FIG. 4, each data augmentation technique may tackle a different problem. As shown in a first step S500, the user data is obtained and then analysed at step S502. A set of personalised settings (which may also be termed hyper-parameters) for each data augmentation approach is then generated at step S504 and these personalised settings (personalised settings 1, personalised settings 2, . . . , personalised settings n) are stored separately as shown at step S506. Each of the personalised settings are then applied to the corresponding data augmentation approach at step S508.

The augmented user data is then generated at step S510 using the data augmentation approaches which have been personalised with the personalised settings. As in FIG. 4, the data augmentation approaches are typically executed in parallel when generating the augmented data. The augmented user data is used to train the original ASR model (e.g. the model received from the server) at step S512.

Figure 6:
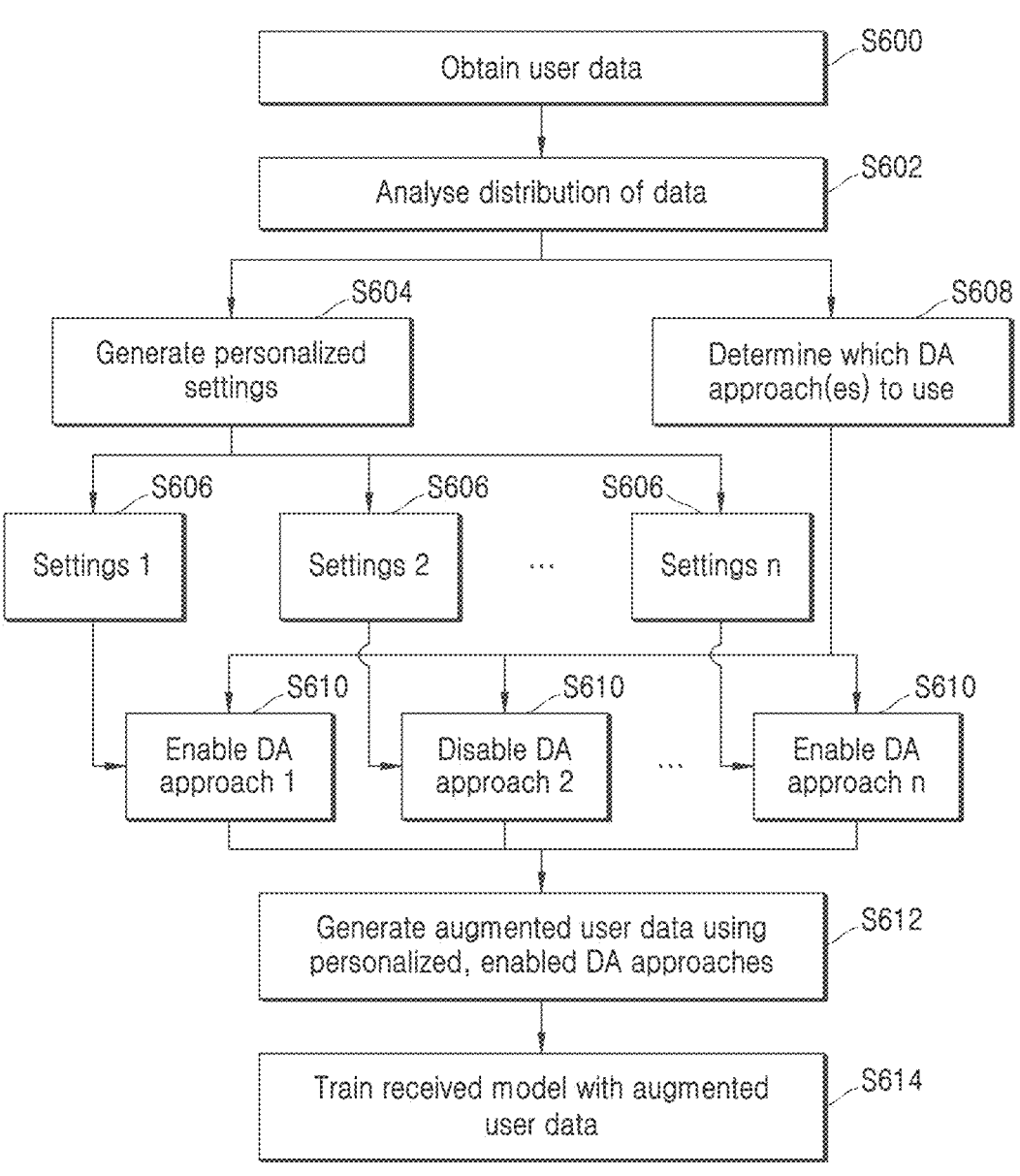
FIG. 6 is a flowchart which combines the methods of FIGS. 4 and 5.

FIG. 6 shows another method for implementing the personalisation of the model which combines the method of FIGS. 4 and 5 and thus generate personalized settings for each of the different data augmentation techniques (DA1, DA2, . . . , DAn). As shown in a first step S600, the user data is obtained and then analysed at step S602. A set of personalised settings (which may also be termed hyper-parameters) for each data augmentation approach is then generated at step S604 and these personalised settings (personalised settings 1, personalised settings 2, . . . , personalised settings n) are stored separately as shown at step S606. Each of the personalised settings are then applied to the corresponding data augmentation approach at step S610. In parallel (or sequentially), the personalised settings (or other data and parameters determined when analysing the user data) may also be used to determine which of the multiple data augmentation approaches are to be used at step S608. Flags to enable or disable each data augmentation approach are then applied so that at step S610, at least one approach is enabled and optionally at least one approach is disabled. As in the FIG. 6, data augmentation approaches 1 and n are enabled and data augmentation approach 2 is disabled.

The augmented user data is then generated at step S612 using the enabled data augmentation approaches which have been personalised with the personalised settings. The augmented user data is used to train the original ASR model (e.g. the model received from the server) at step S614.

Figure 7A:
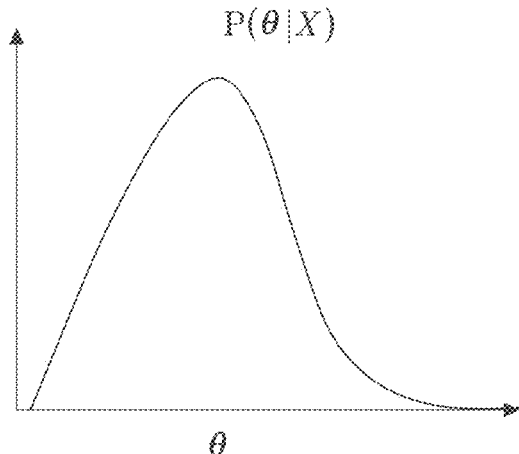
FIG. 7A plots a probability distribution P(θ|X) in the user dataset X for the signal to noise ratio (SNR) as a data augmentation parameter θ.

As a simple example to illustrate the process of FIG. 6, we consider a single data augmentation based on the signal to noise ratio. A single data augmentation may be considered to analyse a univariate distribution. FIG. 7A plots the probability distribution $P(\theta|X)$ in the user dataset X for the signal to noise ratio (SNR) as the parameter $\theta$. This probability distribution is generated by analysing the SNR distribution in the user dataset X (for example, step S602 in FIG. 6). This can be done by any standard technique. For example, the SNR of each data sample in the dataset can first be estimated, e.g. using a technique described in "Relaxed statistical model for speech enhancement and a priori SNR estimation" by Cohen et al. published in IEEE Transactions on Speech and Audio Processing, 2005 incorporated by reference. Once the SNR is estimated for each data sample, the distribution can be computed using a histogram or kernel-based estimation.

Figure 7B:
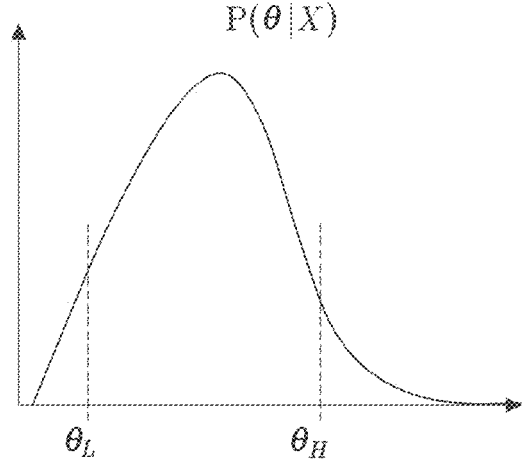
FIG. 7B shows two personalised settings on FIG. 7*a*.

FIG. 7B shows two personalised settings for the data augmentation parameters which have been generated (for example step S604 in FIG. 6). In this example, the personalised settings for the parameters include the lower and upper parameters $\{\theta_L, \theta_H\}$ and these parameters define the most likely range of SNRs in the user dataset. As an illustrative example, the lower parameter $\{\theta_L\}$ may be set as the lower quartile and the upper parameter $\{\theta_H\}$ may be set as the upper quartile. These parameters may then be used to determine whether to enable or disable the corresponding data augmentation (for example step S608 in FIG. 6). For example, if the value of the lower parameter $\{\theta_L\}$ for the distribution of the user data samples is higher than an SNR threshold, the data augmentation may be disabled because the user data $\{X\}$ can be considered to be essentially noiseless. By contrast, if the value of the lower parameter $\{\theta_L\}$ is equal to or lower than an SNR threshold, the data augmentation is enabled. In this example, noise may then be generated in the range of the SNR distribution which has been analysed and this generated noise is added in the data augmentation step (for example, step S612 in FIG. 6).

Figure 8:
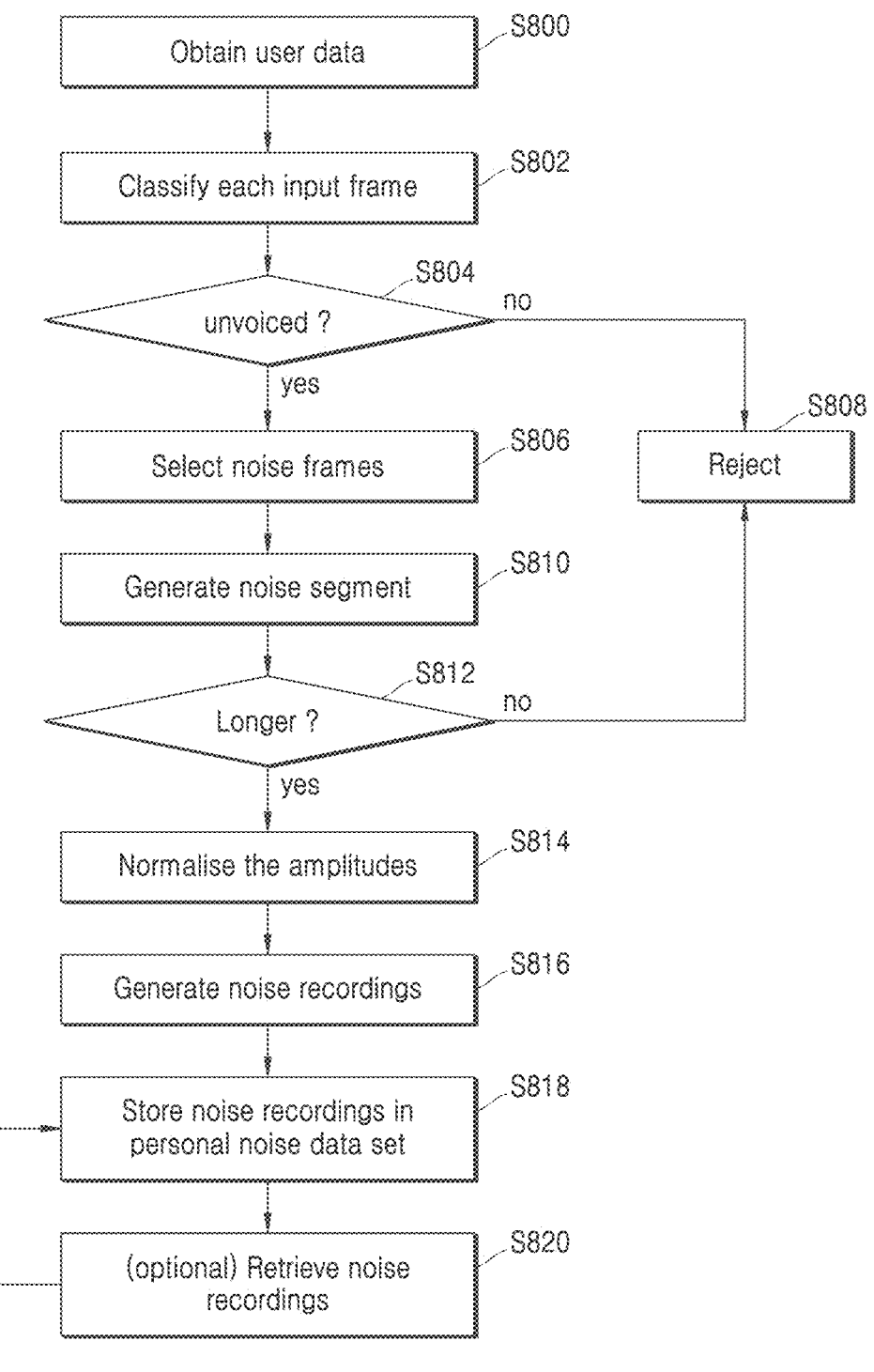
FIG. 8 is a flowchart of a method of generating data to augment a training dataset by using noise which is present in the user dataset.

FIG. 8 is a flowchart of a method of generating data (e.g. signals or information) to augment the training dataset by using noise which is present in the user dataset $\mathcal{A}$ which as explained above comprises a first subset for validation $\mathcal{V}$ and a second subset for training $\mathcal{T}$. In this example, the noise background is extracted from the noisy subset $\mathcal{V}$ and added, in the data augmentation stage, to the remaining subset $\mathcal{T}$ which contains low level of noise. Therefore, the parameters of $\theta$ in Equation 1 are not identified by a set of parameters that describes the noise characteristics, but rather a set of audio recordings. In other words, the noise can be extracted without modelling the distribution and by directly extracting portions of the noise background from the data samples (i.e. audio data).

The proposed noise extraction method of FIG. 8 is based on Voice Activity Detection (VAD) which is described for example in "A Survey and Evaluation of Voice Activity Detection Algorithms" by Meduri et al. published by the Department of Electrical Engineering at Blekinge Tekniska Hogskola in Sweden incorporated by reference. In a first step S800, the user data $\mathcal{A}$ is obtained and separated into the first subset for validation $\mathcal{V}$ and the second subset for training $\mathcal{T}$. In the next step S802, the VAD module classifies every input audio frame in the validation subset $\mathcal{V}$ into voiced or unvoiced. The next step S804 is determine whether an input frame has been classified as unvoiced (i.e. as a noise segment) and if the input frame is unvoiced, the input frame is extracted as a noise segment at step S806. Otherwise, the input frame is rejected and the method loops back to classify the next input frame. At step S806, VAD is used to select extract the noise segments $\mathcal{Z} = \{z_1, z_2, \ldots, z_n\}$, $n \geq 0$. The toolkit employed to perform VAD may be based on a Python implementation of WebRTC or other suitable techniques, for example, as described in "VADLite: An Open-Source Lightweight System for Real-Time Voice Activity Detection on Smartwatches" by Boateng et al published by UbiComp in September 2019 or "Voice Activity Detector (VAD) Based on Long-Term Mel Frequency Band Features by Salishev et al. published in the International Conference on Text, Speech and Dialogue in 2016 incorporated by reference.

At step S810, noise segments are generated by concatenating consecutive noise frames detected by the VAD module. The created noise segments $\mathcal{S}_o = \{z_m, z_{m+1}, \ldots, z_{m+p}\}$, o, m, p $\geq 0$ are then compared to a length threshold at step S812. If the noise segment is longer than the threshold, then it is added to the set of noise segments. Otherwise, the noise segment is rejected at step S808. The segments which are long enough are normalized in amplitude at step S814. It will be appreciated that the normalization may be carried out before the comparison. An example of a normalization method which can be applied is based on modifying the amplitude of the noise segment such that the Root Mean Square (RMS) level is 5 dB. This normalization ensures that the noise segments contain similar levels, so that they can be concatenated smoothly.

At step S816, the noise segments which are longer than a threshold are concatenated to generate the noise recordings $\mathcal{N} = \{S_1, S_2, \ldots, S_q\}$, q $\geq 0$. The noise segments are randomly concatenated even if they are extracted from utterances of a different user. A linear crossfade may be applied in the boundaries of the concatenated segments to avoid large discontinuities in the signal. The concatenation stops when the length of the generated noise recording is longer than the longest user utterance in the training set. These noise recordings which may also be termed noise signals are then stored at step S818 in a personal dataset which may be termed a "persoNoise" dataset (also known as the augmentation database in FIG. 2).

Additionally in an optional step S820, similar noise signals can be retrieved from a generic noise dataset and can be included in the persoNoise dataset at step S818. This technique constitutes a method of data grouping, which is defined as augmenting the data of an individual by adding similar samples taken from another broader dataset. The similarity between noise vectors may be computed using any suitable technique, including the cosine similarity in the power spectral density domain. Thereby, the concatenated noise segments $S_0$ serve as audio spectral reference of the noises encountered in each individual's recordings. Thus, for each ensemble noise segment $S_q$, the most similar noise sample of an external noise dataset is picked and added in the persoNoise dataset.

Figure 9:
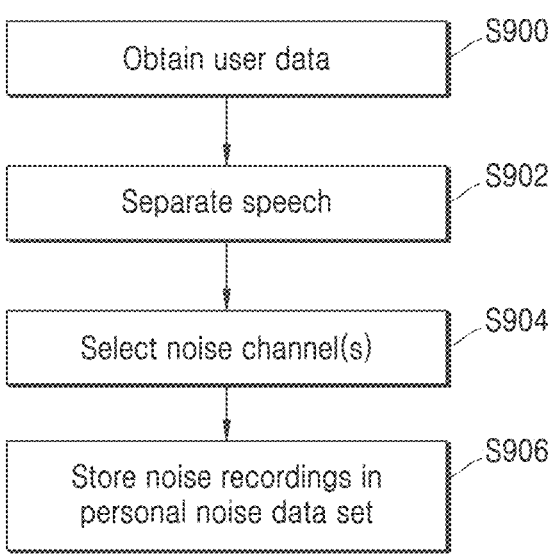
FIG. 9 is a flowchart of an alternative method of generating data to augment the training dataset.

FIG. 9 is a flowchart of an alternative method of generating data to augment the training dataset. As an alternative to extracting the noise profile from unvoiced segments, a speech separation model can be employed to extract the background noise, for example as described in "Attention is all you need in speech separation," by Subakan et al. in *ICASSP*, 2021, pp. 21-25 incorporated by reference. In a first step S900, the user data is obtained as previously. The speech data within the user is then separated at step S902 by deploying the separation module described in the paper by Subakan, namely the SepFormer model. Once the audio source in a recording is separated, the noise channels are selected at step S904. This selection is carried out using the VAD described in FIG. 8. The channel with the least amount of voiced segments is then stored as a noise recording in the persoNoise dataset at step S906.

Figure 10:
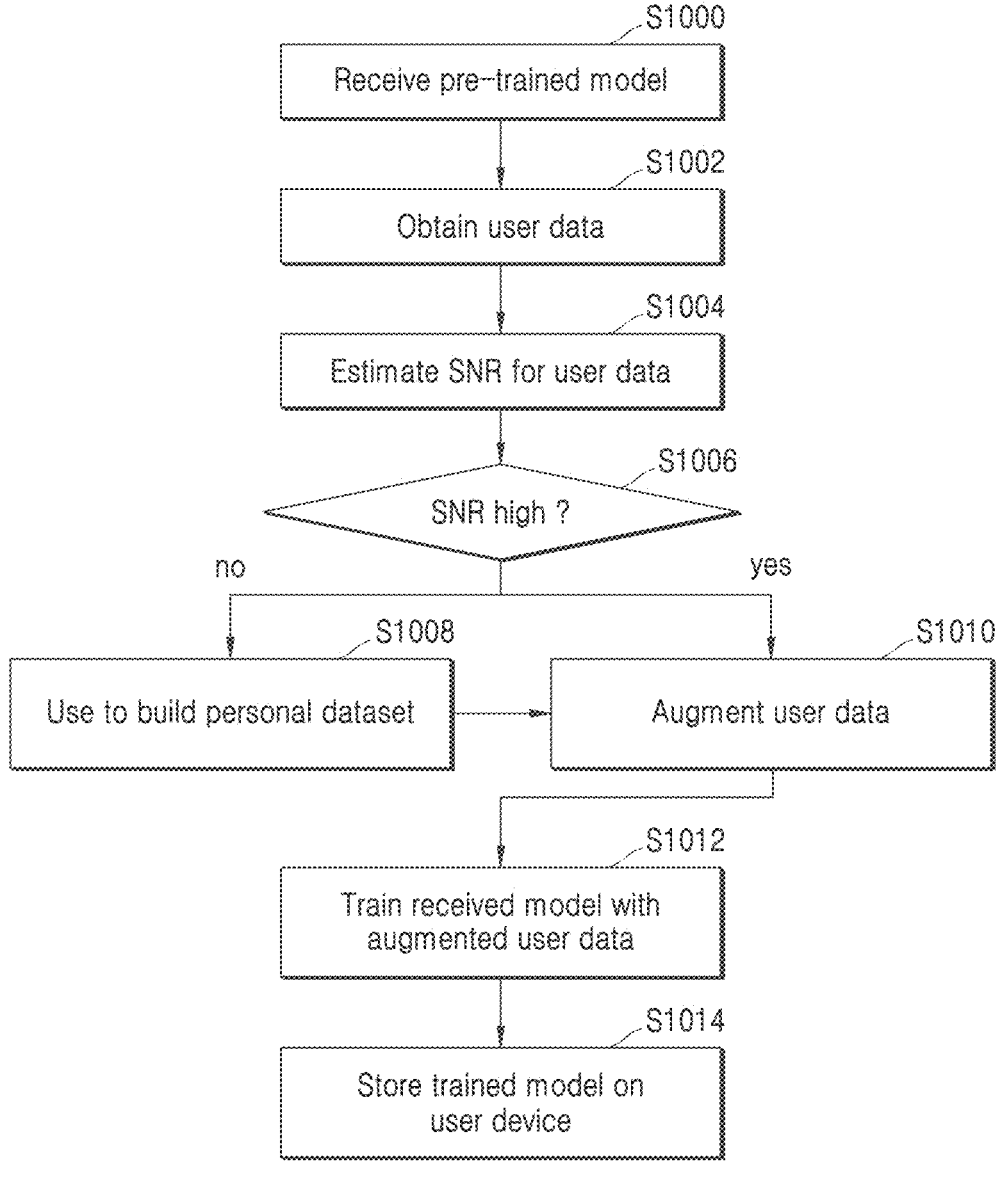
FIG. 10 is a flowchart showing how the noise recordings generated in FIG. 8 or FIG. 9 can be used to personalise an ASR model.

FIG. 10 is a flowchart showing how the noise recordings generated in FIG. 8 or FIG. 9 can be used to personalise an ASR model. In a first step S1000, the pre-trained ASR model is received, and the user data is obtained at step S1002. For example, as described with reference to FIG. 7A, the SNR of the user data is then estimated at step S1004. The estimated SNR for each part of the user data is then compared to a threshold at step S1006. If the SNR is low, the data is noisy audio and at step S1008, this data can be used to build a personal noise data set as described in FIG. 8 or FIG. 9. If the SNR is high, the data is not noisy and as shown at step S1010, this data can be augmented with the noise from the personal dataset. The received model is then trained with the augmented user data at step S1012, and the trained model is stored on the user device at step S1014.

Figure 11A:
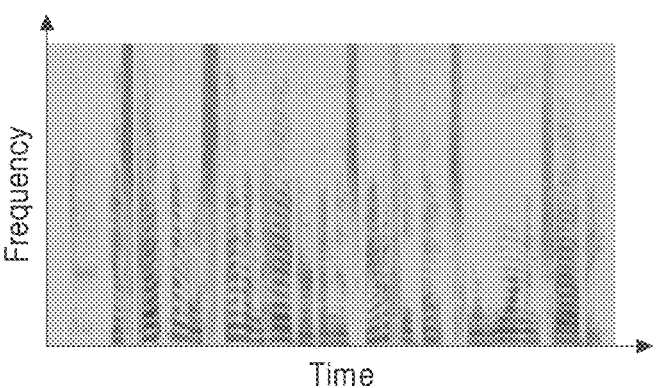
FIG. 11A plots an example of a signal with a high SNR.
Figure 11B:
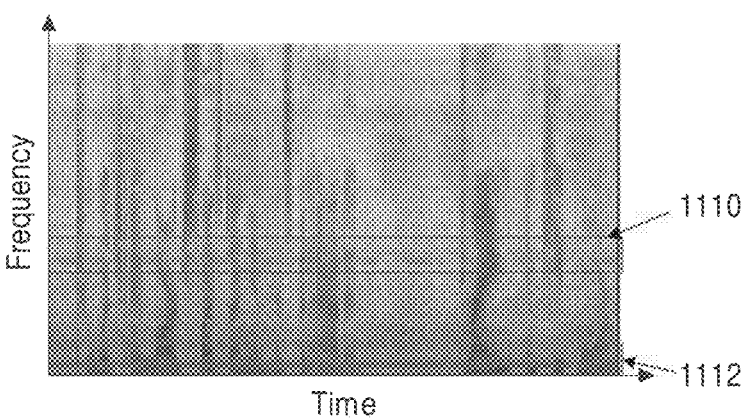
FIG. 11B plots an example of a signal with a low SNR.
Figure 11C:
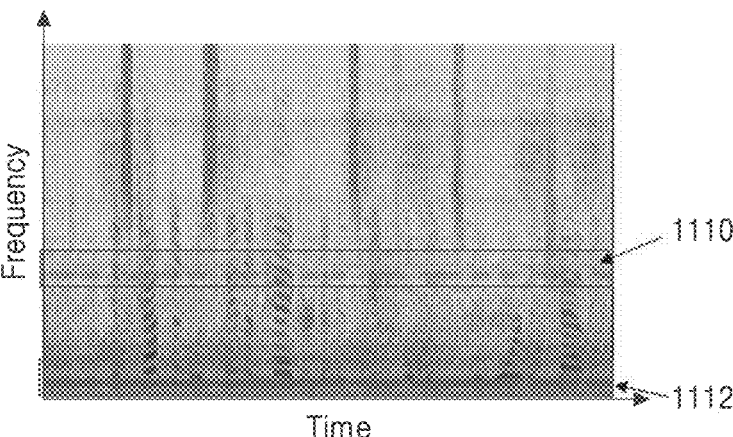
FIG. 11C plots the signal of FIG. 11A which has been augmented using two noise profiles from FIG. 11B.

FIG. 11A plots an example of a signal with a high SNR, in other words a signal which is clean data. FIG. 11B plots an example of a signal with a low SNR, in other words a noisy signal and two noise profiles 1110, 1112 are labelled on the signal. These noise profiles can be saved in the personal noise dataset. FIG. 11C plots the signal of FIG. 11A which has been augmented using the two noise profiles of FIG. 11B. The signal of FIG. 11C is thus augmented data which can be used to train the model as described above.

Figure 12:
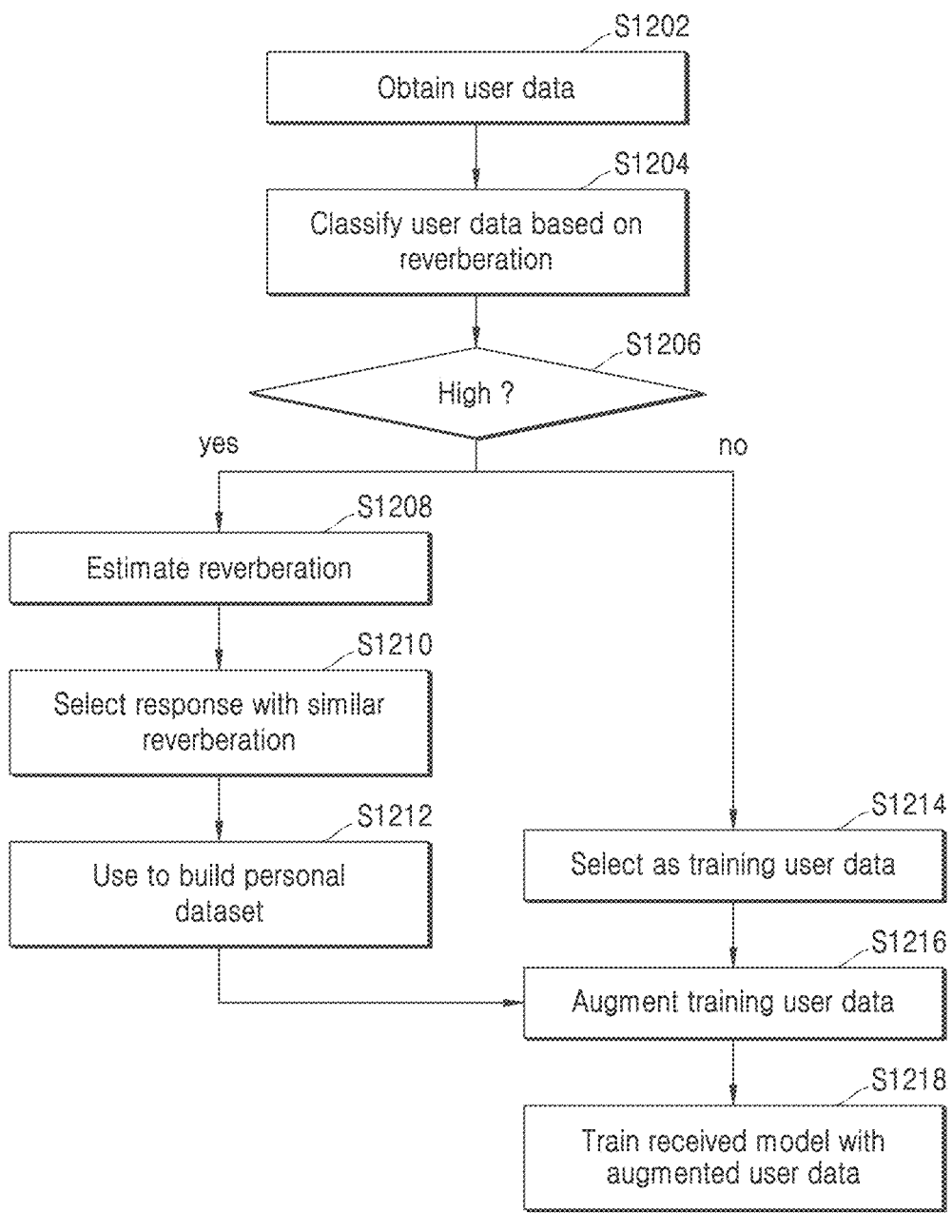
FIG. 12 is a flowchart of a method of generating data to augment the training dataset to mimic the reverberation which is present in the user dataset.

FIG. 12 is a flowchart of a method of generating data to augment the training dataset to mimic the reverberation which is present in the user dataset $\mathcal{A}$ which is obtained in a first step S1202. The level of reverberation is estimated and used to classify each audio frame of the user data at step S1204. If the level of reverberation is determined to be high at step S1206, the frame is added the first subset of validation data $\mathcal{V}$ and if the level of reverberation is determined to be low at step S1206 the frame is added to the training data at step S1214. If none or only a small number of frames have high reverberation, there is little reverberation in the audio recording and thus reverberation will not be selected as a data augmentation technique to be used. For the first subset of validation data, the next step is to estimate the reverberation at step S1208.

At step S1208, we use the reverberation time (T60) as described in "Room acoustics" by Kuttruff published in CRC Press 2016 incorporated by reference to measure the level of reverberation, that is, θ is set as T60. T60 is defined as the time needed for the sound pressure level in the room to drop 60 dB after the acoustic excitation cease. Any suitable method may be used to measure the level of reverberation. A first example is based on a statistical modelling of the sound decay and is described in "An improved algorithm for blind reverberation time estimation," by Lollmann et al. published in IWAENC in 2010 incorporated by reference. A second example of a T60 estimation method is an algorithm based on spectral decay distributions described in "Noise-robust reverberation time estimation using spectral decay distributions with reduced computational cost," by Eaton et al. published in ICASSP 2013 incorporated by reference.

Once the level of reverberation is estimated for a given utterance, at step S1210, the Room Impulse Response (RIR) with the closest T60 is drawn from the generic RIR database. This may be done by computing the reverberation of each sample in the generic RIR database and comparing the computed reverberation of each sample with the estimated reverberation to find the closest match. At step S1212, the selected response is stored in a personal reverberation dataset which may be termed a persoReverb dataset (or may be known as the augmentation database of FIG. 2). It will be appreciated that such a personal reverberation dataset is only created when there are sufficient recordings in the user dataset which have a reverberation which is above a minimum threshold. As shown at step S1216, the responses stored in the personal dataset are then applied to the second subset of training data T which has low reverberation to augment this training data. The received general ASR model is then trained at step S1218 with the augmented user data.

Figure 13:
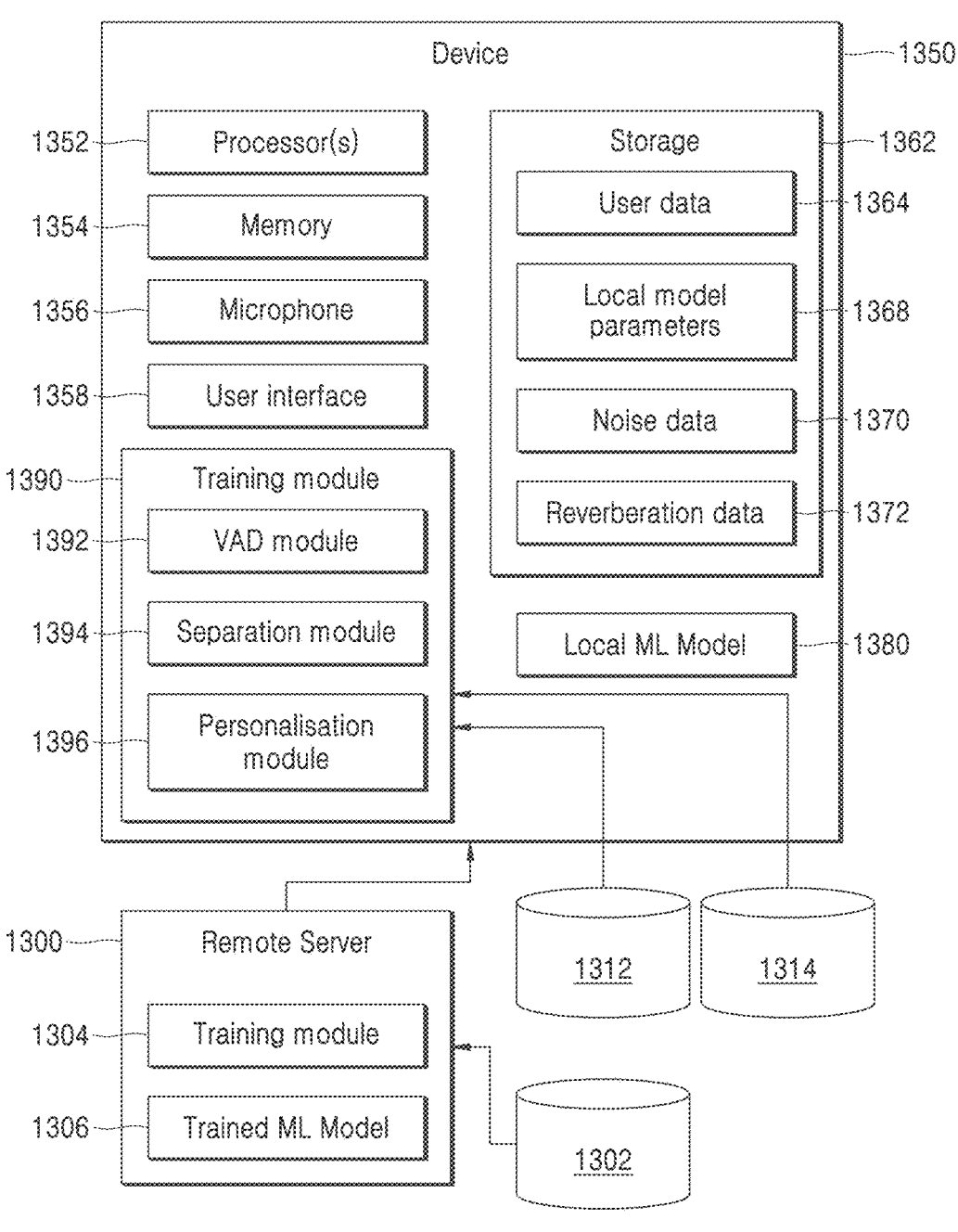
FIG. 13 is a schematic block diagram of a system for implementing the method of FIGS. 3 to 6 and 8 to 10 and 12.

FIG. 13 is a block diagram of a system comprising a server 1300 for training a full precision machine learning, ML, model 1306 and a user device 1350 for implementing the methods described above to generate a local ML model 1380 which is then stored on the local device for use at inference time. It will be appreciated that the system may comprise multiple local devices which may also be termed client devices or user devices.

The server 1300 is arranged to perform any pre-training steps which are required to generate an initial trained ML model 1306. The server 1300 receives reference training data (inputs x and outputs/labels y) from a database 1302. The server 1300 comprises a training module 1304 which receives as input the reference data from the database 1302 and outputs the basic or full precision model parameters (i.e. the set of weights or parameters which have been learnt during the training process).

The user device 1350 may be any one of: a smartphone, tablet, laptop, computer or computing device, virtual assistant device, a vehicle, a drone, an autonomous vehicle, a robot or robotic device, a robotic assistant, image capture system or device, an augmented reality system or device, a virtual reality system or device, a gaming system, an Internet of Things device, or a smart consumer device (such as a smart fridge). It will be understood that this is a non-exhaustive and non-limiting list of example devices. The device 1350 comprises the standard components, for example at least one processor 1352 coupled to memory 1354. There may also be a microphone 1356 for capturing speech and a user interface 1358 to capture other user input. It will be appreciated that there may be other standard components which are not shown for simplicity. The device 1350 may comprise one or more modules for collecting user data 1364 which is stored in storage 1362 and such storage may be an encrypted storage. Merely as examples, the modules may include the microphone 1356 and the user interface 1358.

The at least one processor 1352 may comprise one or more of: a microprocessor, a microcontroller, and an integrated circuit. The memory 1354 may comprise volatile memory, such as random access memory (RAM), for use as temporary memory, and/or non-volatile memory such as Flash, read only memory (ROM), or electrically erasable programmable ROM (EEPROM), for storing data, programs, or instructions, for example.

There is a training module 1390 on the user device which personalises the full precision ML model 1306 to generate a local ML model 1380 which is personalised to a target user. The training module 1390 comprises the various modules which are required to personalise the model. Merely as examples, a VAD module 1392 which may detect voice activity and a separation module 1394 which separates the speech are shown. These are described above in relation to FIGS. 8 to 10. As a general example, a personalisation module 1396 is also shown and this module may be used to optimise the data augmentation parameters as described above. The local model parameters 1368, the personal noise data 1370 and the personal reverberation data 1372 may be stored in the storage 1362. These personal datasets may be created as described above, for example by drawing from general noise dataset 1312 and/or a general reverberation dataset 1314 which are shown as connected to but separate from the user device 1350. When the data augmentation files are local to the user device, this should reduce latency, cost and training time because there is no need to share the data augmentation files between the server and the user device.

As an alternative to federated learning in which the training module 1390 is on the user device, there may be a personalisation training module (not shown) on the server 1300. When using the training module 1304 on the server, local data is received from the user device 1350 to carry out the personalisation in a similar manner to that described in relation to the training on the user device. The personalised ML model which is generated on the server is then sent to the user device to be stored as the local ML model 1380. This may be termed distributed learning. It is also possible that the local model (i.e. federated model) which is trained on the user device is sent to the server. The server can then combine the locally trained models using any suitable technique to further improve the model.

Experimental Analyses

The method and framework described above are evaluated in the context of personalization. For this purpose, a validation set and global set are created. The validation set is used to measure personalization performance, whereas the global set is employed to measure the catastrophic forgetting, for example as described in "Catastrophic interference in connectionist networks: The sequential learning problem," by McCloskey et al. published in *Psychology of learning and motivation* 1989 incorporated by reference. Also, the validation set is used to obtain the persoDA parameters θ in an unsupervised manner (i.e. for parameter estimation without using labels). In the experiments, we focus on automatic speech recognition (ASR). We use Word Error Rate (WER) as an accuracy measure.

We implemented ASR models using the transformer recipe for LibriSpeechdescribed in "SpeechBrain: A general-purpose speech toolkit" by Ravanelli et al. published in arXiv 2106.04624 in 2021 incorporated by reference. The recipe implements an end-to-end transformer ASR architecture with a Conformer encoder for example as described in "Conformer: Convolution-augmented Transformer for Speech Recognition," by Gulati et al. in *Interspeech*, 2020 incorporated by reference. The Conformer configuration follows the Conformer (S). The loss is computed using a weighted average of the CTC loss and KL-divergence with label smoothing set to 0.15. The model is trained by applying "SpecAugment" following "LibriFullAdapt" policy as described for example in "Specaugment: A simple data augmentation method for automatic speech recognition," by Park et al. in *Interspeech* incorporated by reference, 2019 for 200 epochs and the best model is selected based on the Word Error Rate (WER) achieved in the validation set. Unless stated otherwise, all the experimental results are reported using a beam search of size 1 and without using a language model to speed up the analyses.

In the personalization experiments, we fine-tune all the parameters of the ASR models with Adam optimizer and a fixed learning rate of 2.5e-5. SpecAugment is also applied following the LibriFullAdapt policy. The method described above (which may be termed personDA) is compared to the MCT augmentation techniques described in "A study on data augmentation of reverberant speech for robust speech recognition," by Ko et al. published in *ICASSP*, 2017 incorporated by reference (named as +reveberation and +noise in the section below) where the noises and RIRs are randomly selected and added. The best probability of including reverb or including noise is found empirically for each method.

Before performing personalization experiments, the ASR model is trained on LibriSpeech as described in "Librispeech: An ASR corpus based on public domain audio books," by Panayotov et al. published in *ICASSP*, 2015 incorporated by reference using MCT achieving 4.13% WER in dev-clean. The LibriSpeech dataset comprises 960 hours of English audiobook utterances, sampled at 16 kHz. The total size of the training data is reduced to 940 hours after excluding the speakers included in validation set V to avoid data overlap with the evaluation set of the VOiCES dataset which is described in "Voices Obscured in Complex Environmental Settings (VOiCES) Corpus," by Richey et al. published in *Interspeech*, 2018 incorporated by reference.

Three different sets are created to perform the personalization experiments. The global set, used as a measure of catastrophic forgetting, is created by extracting a small random subset (14 min) from LibriSpeech dev-clean set. The Validation set V is designed using data of 18 users from the VOiCES evaluation set containing more utterances. As described in the relevant paper, VOiCES is created by recording LibriSpeech utterances played in acoustically challenging conditions. Using this dataset for evaluation allows assessing accuracy of the proposed methods in realistic and noisy reverberant environments. The personalization training set $\mathcal{T}$, utilized to adapt the model, consists of clean versions of the noisy reverberant utterances present in the validation set. That is, $\mathcal{V}_i = f_i(\mathcal{T}_i)$ where $f_i$ is the unknown i th augmentation applied to the ith utterance in the training set $\mathcal{T}_i$ to get the validation utterance $\mathcal{V}_i$ In the VOiCES dataset, the augmentation $f(\cdot)$ is created by replaying recordings in a noisy room environment. Note that a user's dataset could also be split using a T60 measure of reverberation as described in the paper by Lollman mentioned above and a Signal-to-Noise Ratio (SNR) estimator, for example as described in "Robust signal-to-noise ratio estimation based on waveform amplitude distribution analysis," by Kim et al. published in *Interspeech*, 2008 incorporated by reference.

Table 1 below displays the number of utterances (#Utt) and duration for the training and validation sets. The average ±standard deviation across each of the 18 users' set is displayed.

TABLE 1

| Data set | #Utt | Duration (minutes) |
|---|---|---|
| Validation | 50.06 ± 12.94 | 12.94 ± 3.35 |
| Training | 13.22 ± 4.28 | 3.41 ± 0.71 |

As described above, two main generic datasets (or databases) are used for data augmentation. A first database comprises room impulse responses (RIRs), and a second database contains noise recordings. We use a set of room impulse responses gathered from 3 datasets for example as described in the paper by Ko. The first database thus comprises 325 different RIRs. The noise dataset contains 843 noise samples obtained from the Freesound portion of the MUSAN corpus which is described in "MUSAN: A music, speech, and noise corpus," by Snyder et al published in *arXiv*, vol. abs/1510.08484 incorporated by reference. The SNR is sampled from a uniform distribution between 0-30 dB.

The Word Error Rate (WER) is used as the performance metric. The Global WER indicates the level of catastrophic forgetting and Valid WER, computed on $\mathcal{V}$, indicates the personalization performance. The personalized WER is computed across different personalized models on each user's validation set.

Table 2 shows the comparison of the noise-based techniques presented in FIGS. 8 and 9 above each of which have been trained for 100 steps.

TABLE 2

| Method | Evaluation Set (WER %) | |
|---|---|---|
| | Global | Valid |
| VAD based (FIG. 8) | 4.25 | 14.58 |
| VAD based + Data grouping (FIG. 8 & step S820) | 4.2 | 14.74 |
| Speech separation based (FIG. 9) | 4.24 | 15.1 |

Table 2 shows that the best performance is achieved by the VAD based noise extraction method of FIG. 8 without the optional data grouping of step S820. This VAD based approach is computationally lighter compared to the speech separation based approach of FIG. 9. The WebRTC VAD algorithm uses a Gaussian Mixture Model to perform the speech-noise detection, whereas the speech separation can only be performed effectively by large deep learning models (in this case, with 25.7M parameters). Thus, we refer to the personalised VAD based approach without grouping as the "personoise" technique.

Table 3 below compares the two methods for calculating the reverberation in the method of FIG. 12. Again the word error rate (WER %) is shown for two models trained for 100 steps.

TABLE 3

| Method | Evaluation set (WER %) | |
|---|---|---|
| | Global | Valid |
| Sound decay modelling based (using T60 method described in paper by Lollmann) | 4.3 | 11.53 |
| Spectral decay distributions based (using technique in paper by Eaton) | 4.26 | 11.69 |

The table suggests that the sound decay modelling provides a lower WER. Thus, we refer to the personalised reverberation data augmentation based approach using this method as the "persoReverb" technique.

Now that we have established which of the new methods is to be compared with standard techniques, we analyse the performance of the proposed methods and compare them to the baseline data augmentation—multi-condition-training (MCT) which is based on randomly selecting the reverberation (RIR) and/or noise respectively for each clean utterance. Table 4 provides a comparison for different combinations of the personalized and non personalized data augmentation methods, when models are trained for 1000 steps. The two methods shown in italics do not augment data.

"No personalisation" refers to the baseline, namely a method in which the model is not fine-tuned on the target user's data. "Baseline personalization" refers to a method which simply fine-tunes models on the target user's data without any data augmentation. "+reverberation" is a baseline data augmentation method which randomly picks reverberation from a database to perform augmentation. "+noise" is a baseline data augmentation method which randomly picks noise from a database to perform augmentation. "+reverberation+noise" is a baseline data augmentation method which randomly picks reverberation and noise from a database to perform augmentation. "+persoReverb" is the proposed new technique which uses sound decay modelling to include reverberation in the data augmentation. "+persoNoise" is the proposed new technique which uses noise from the user's dataset in a VAD based approach. "+persoReverb+noises" combines the new technique for personalised data augmentation using reverberation with a standard technique in which noise is added randomly. "+reverberation+persoNoise" combines the new technique for data augmentation using personal noise with a standard technique in which reverberation is added randomly. "+persoReverb+persoNoise" combines the two new proposed techniques.

TABLE 4

| Method | Evaluation set (WER %) | |
|---|---|---|
| | Global | Valid |
| *No personalization* | *4.13* | *18.22* |
| *Baseline personalization* | *4.78* | *7.15* |
| +reverberation | 4.71 | 3.89 |
| +noise | 4.72 | 7.31 |
| +reverberation + noise | 4.68 | 3.53 |
| +persoReverb | 4.76 | 3.6 |
| +persoNoise | 4.8 | 6.52 |
| +persoReverb + noises | 4.73 | 3.35 |

TABLE 4-continued

| Method | Evaluation set (WER %) | |
| | Global | Valid |
|---|---|---|
| +reverberation + persoNoise | 4.69 | 3.26 |
| +persoReverb + persoNoise | 4.68 | 3.04 |

The performance of the combined proposed approach (+persoReverb+persoNoise) achieves the best performance overall, reducing the WER by 13.88% compared to random selection of noises and RIRs. This combined approach may be termed persoDA.

Table 4 also indicates that the personalized data augmentations outperform the random data augmentation. Indeed, the method of FIG. 12—persoReverb reduces the error by 7.45% relative WER compared to the random counterpart, and the approach of FIG. 8—persoNoise decreases the error by 10.81% relative WER. The results given in Table 4 suggest that reverberation is more beneficial for the VOiCES dataset compared to adding only noise. In fact, the WER achieved using random noises (i.e. the results indicated by +noise) is higher than the baseline, unlike the WER obtained using the approach of FIG. 8—persoNoise.

Table 5 presents a comparison of the word error rate of models trained with different number of training steps. The methods compared are standardMCT techniques using reverberation and noise as well as the proposed new method, namely persoDA which combines persoReverb and persoNoise. The bottom row shows the relative improvement of persoDA over MCT.

TABLE 5

| Method | Number of steps (valid WER %/global WER %) | | | |
| | 100 | 250 | 500 | 1000 |
|---|---|---|---|---|
| MCT | 11.89/4.26 | 7.86/4.35 | 5.31/4.52 | 3.53/4.68 |
| persoDA | 11.32/4.23 | 7.38/4.35 | 4.89/4.54 | 3.04/4.68 |
| Rel. Impr. | 4.79/0.70 | 6.11/0.00 | 7.91/−0.44 | 13.88/0.00 |

The results in Table 5 indicate that after 100 steps, the proposed models achieve a relative WER improvement of 4.79% in the validation set and slight improvement in the global set when compared to the standard MCT technique. This relative improvement obtained using the validation set keeps increasing with the number of steps reaching a relative WER improvement of 13.88% without degradation on the global set.

The results in Table 6 are generated in an experiment in which only pseudo-labels are accessible as described in "Self-training for end-to-end speech recognition," by Kahn et al. published in *ICASSP* 2020 incorporated by reference. In other words, a user is not required to label the transcripts. As for Table 4, the two methods shown in italics do not augment data and provide baseline personalization experiments which are based on simply fine-tuning models on the training data without MCT augmentation.

TABLE 6

| Method | Evaluation set (WER %) | |
| | Global | Valid |
|---|---|---|
| No personalization | *4.13* | *18.22* |
| Baseline personalization | *4.24* | *15.82* |
| +reverberation + noise | 4.24 | 12.66 |
| +persoReverb + persoNoise | 4.22 | 12.32 |

Table 6 shows that our method (persoDA) outperforms the baselines without data augmentation and the baseline with data augmentation even under this constrained setup where the WER of the pseudo-labels is 3.71%.

Table 7 shows the results of an evaluation on disjoint training and validation sets. In this experiment, the training set $\mathcal{T}$ is split into 2 subsets with equal number of utterances: $\mathcal{T}$ ' and $\mathcal{T}$ ". A similar split is applied to the validation set $\mathcal{V}$ where $\mathcal{V}$ ' comprises the noisy reverberant versions of the utterances in $\mathcal{T}$ ', and $\mathcal{V}$ " contains the noisy reverberant versions of the utterances in $\mathcal{T}$ ". Thus, in this setup, the training phase of model personalization uses only $\mathcal{T}$ ' set, and persoDA uses only $\mathcal{V}$ ' to extract unsupervised information to guide the DA. This allows us to measure the performance of models on the unseen acoustic environments in $\mathcal{V}$ ". As for Table 6, the two methods shown in italics do not augment data.

TABLE 7

| Method | Evaluation set (WER %) | | |
| | Global | $\mathcal{V}$ ' | $\mathcal{V}$ " |
|---|---|---|---|
| No personalization | *4.13* | *18.12* | *18.13* |
| Baseline personalization | *4.25* | *13.49* | *18.37* |
| +reverberation + noise | 4.3 | 11.33 | 15.77 |
| +persoReverb + persoNoise | 4.29 | 10.96 | 15.35 |

Table 7 shows the results indicating that the proposed approach not only achieves the best results on $\mathcal{V}$ ', but also in $\mathcal{V}$ " which relates to unseen acoustic condition by the proposed approach (persoDA=persoNoise and persoReverb). In Table 7, the method has been trained for 100 steps.

The results in Table 8 are generated in an experiment which is similar to that described above for Table 7 but in which only pseudo-labels are accessible as described in "Self-training for end-to-end speech recognition," by Kahn et al published in *ICASSP* 2020 incorporated by reference. Again, the proposed method outperforms the methods in italics without data augmentation and the standard approach for data augmentation (+reverberation+noise).

TABLE 8

| Method | Evaluation set (WER %) | | |
| | Global | $\mathcal{V}$ ' | $\mathcal{V}$ " |
|---|---|---|---|
| No personalization | *4.13* | *18.12* | *18.13* |
| Baseline personalization | *4.28* | *14.98* | *18.28* |
| +reverberation + noise | 4.3 | 12.01 | 15.63 |
| +persoReverb + persoNoise | 4.27 | 11.37 | 15.32 |

In Table 7, the method has been trained for 100 steps and in table 9, the same experiment using disjoint training and validation sets was conducted but with training for 250 steps. Again, the proposed method outperforms the methods in italics without data augmentation and the standard approach for data augmentation (+ reverberation+noise)

TABLE 9

| | Evaluation set (WER %) | | |
|---|---|---|---|
| Method | Global | $\mathcal{V}'$ | $\mathcal{V}''$ |
| No personalization | _4.13_ | _18.12_ | _18.13_ |
| Baseline personalization | _4.43_ | _10.0_ | _18.78_ |
| +reverberation + noise | 4.39 | 6.73 | 15.32 |
| +persoReverb + persoNoise | 4.41 | 6.17 | 14.86 |

In Table 6, the method has been trained for 100 steps and uses pseudo-labelling and in table 10, the same experiment with pseudo-labelling was conducted but with training for 250 steps. Again, the proposed method outperforms the methods in italics without data augmentation and the standard approach for data augmentation (+ reverberation+ noise).

TABLE 10

| | Evaluation set (WER) | |
|---|---|---|
| Method | Global | Valid |
| No personalization | _4.13_ | _18.22_ |
| Baseline personalization | _4.39_ | _13.85_ |
| +reverberation + noise | 4.27 | 9.8 |
| +persoReverb + persoNoise | 4.33 | 9.46 |

The results in Table 11 are generated in an experiment which is similar to that described above for Table 7 and has disjoint samples but in which the method is trained for 1000 steps. Again, the proposed method outperforms the methods in italics without data augmentation and the standard approach for data augmentation (+ reverberation+noise).

TABLE 11

| | Evaluation set (WER %) | | |
|---|---|---|---|
| Method | Global | $\mathcal{V}'$ | $\mathcal{V}''$ |
| No personalization | _4.13_ | _18.12_ | _18.13_ |
| Baseline personalization | _4.85_ | _5.68_ | _19.7_ |
| +reverberation + noise | 4.81 | 2.65 | 15.58 |
| +persoReverb + persoNoise | 4.8 | 2.41 | 15.45 |

The results in Table 12 are generated in an experiment which is similar to that described above for Table 6 or Table 10 and uses pseudo-labelling but in which the method is trained for 1000 steps. Again, the proposed method outperforms the methods in italics without data augmentation and the standard approach for data augmentation (+reverberation+noise).

TABLE 12

| | Evaluation set (WER) | |
|---|---|---|
| Method | Global | Valid |
| No personalization | _4.13_ | _18.22_ |
| Baseline personalization | _4.84_ | _10.14_ |
| +reverberation + noise | 4.7 | 6.71 |
| +persoReverb + persoNoise | 4.7 | 6.28 |

The results in Table 13 are generated in an experiment which is similar to that described above for Table 8 which uses disjointed data and in which only pseudo-labels are accessible as described in the paper by Kahn et al incorporated by reference. In the experiment in Table 13, the method is trained for 1000 steps. Again, the proposed method outperforms the methods in italics without data augmentation and the standard approach for data augmentation (+reverberation +noise).

TABLE 13

| | Evaluation set (WER %) | | |
|---|---|---|---|
| Method | Global | $\mathcal{V}'$ | $\mathcal{V}''$ |
| No personalization | _4.13_ | _18.12_ | _18.13_ |
| Baseline personalization | _4.77_ | _8.74_ | _19.62_ |
| +reverberation + noise | 4.69 | 5.93 | 16.19 |
| +persoReverb + persoNoise | 4.75 | 5.81 | 16.13 |

In summary, the results of Tables 1 to 13 show that the proposed personalized data augmentation framework called persoDA helps to adapt ASR models to users' acoustic characteristics. In the experiments shown above, this framework has been demonstrated to work when considering two types of acoustic distortions present in on-device recordings: background noise and reverberation. The methods are termed persoNoise and persoReverb and can be used alone or together to provide a framework which personalizes the training datasets for specific users. The proposed approach has low complexity and requires only a set of personal reverberation data and/or personal noise data (typically of only 1 second long each) to be stored on the target platform, as opposed to the standard approach MCT where RIRs and long noise recordings need to be saved. The experimental analyses detailed above show the effectiveness of the persoNoise and persoReverb for ASR personalization tasks reducing the error by 13.88% relative WER compared to the standard DA methods which use random noises and reverberation (e.g. RIRs).

Figure 14:
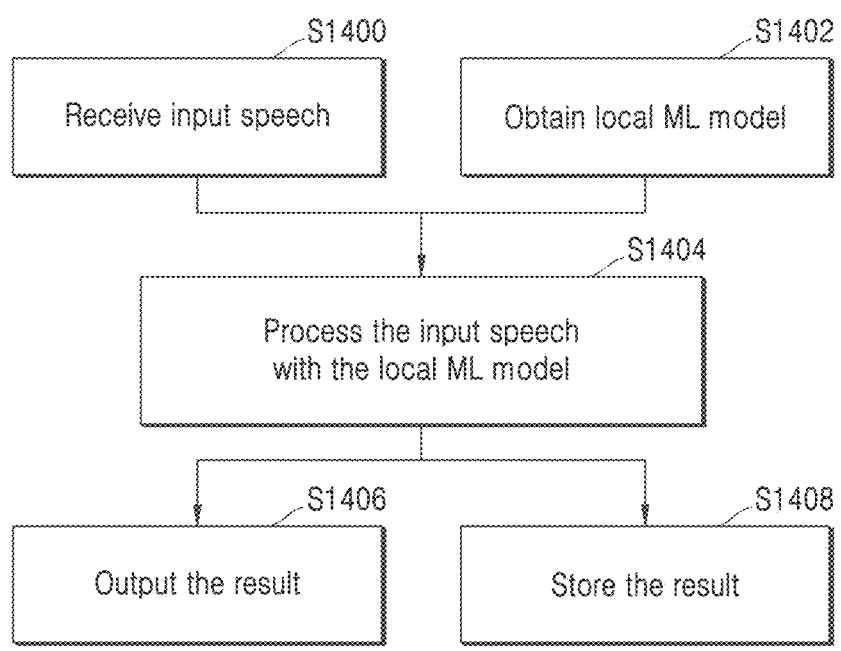
FIGS. 14 and 15 are flowcharts of applications for using the personalised model, for example using a user device shown in FIG. 13.
Figure 15:
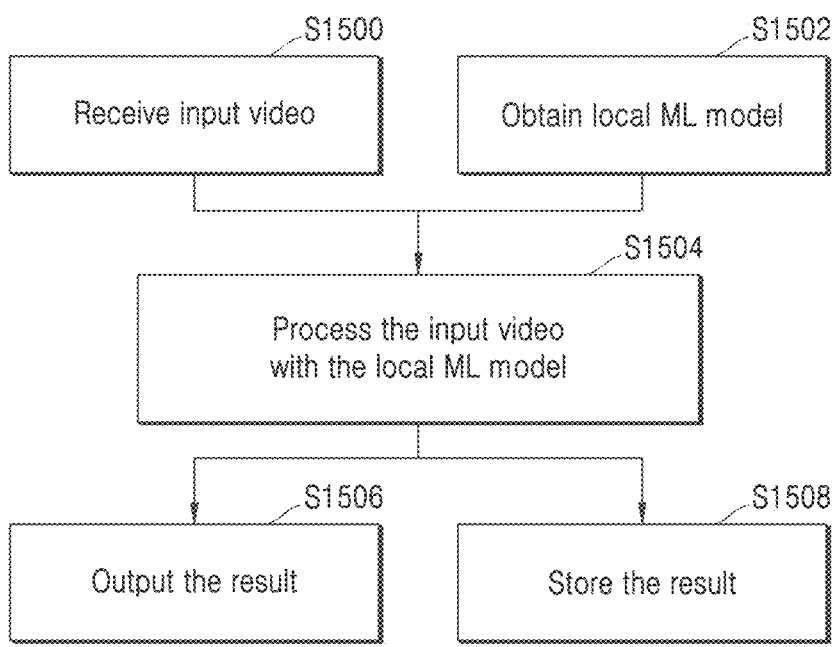

FIGS. 14 and 15 illustrate some uses of a personalised model which has been generated and stored on a user device as described above. FIG. 14 is a flowchart for generating an output using an automatic speech recognition model. In a first step S1400, input speech is received, for example by a user speaking into a microphone. The next step S1402, which may be done simultaneously with the first step, is to obtain the local ML model from storage on the user device. In this case, the local ML model is an automatic speech recognition model which has been personalised using speech data samples which are local to the user device, e.g. for the user(s) of the device.

As shown at step S1404, the input speech is processed using the model and the result is output at step S1406. The input speech may be a command which is processed by the user device to output a change to a setting on the user device, e.g. to increase the volume or to activate an application, e.g. to play music. Alternatively, the output may be a transcription of the input speech. Outputting the transcript may comprise outputting a video file which comprises the original speech as audio (either as video or audio file) and the transcript published on screen alongside the original speech. Alternatively, the input speech may be a question or query, e.g. "find photographs of my birthday party" which is then processed by the user device to generate and hence output an answer to the query, in this case the requested photographs. As shown at step S1408, the output may optionally be stored together with the input speech file. The input speech file and output form user data which may be used to personalise the general purpose ASR model as described above.

Before the result is output, there may be an optional stage (not shown) in which a user can approve or disapprove the result. For example, when generating a transcript or results to a query, the user reads the transcript or answer to the query and can indicate their approval or otherwise using a user interface. In the case of a transcript, when the user can approve the transcript, the transcript is output. Alternatively, when there is no approval, the user manually enters the correct transcript or edits the transcript generated by the model. The manual corrected or entered transcript may then be output as the result of the process.

FIG. 15 is a variation on FIG. 14 in which an input video is received at step S1500. The next step S1502 is to obtain the local ML model from storage on the user device. In this case, the local ML model is a video processing model which has been personalised using video data samples which are local to the user device. As shown at step S1504, the input video is processed using the obtained local ML model and the result is output at step S1506. In one example, the local ML model may be an automatic speech recognition model and the input video may be processed to generate captions (or subtitles) for the video. At step S1508, the output may optionally be stored together with the input video file.

Thus, the user data is analysed to determine whether or not to apply data augmentation and thus the selection of the data augmentation is personalised to the or each user. Furthermore, the data augmentation is applied to the training subset which has lower levels of the acoustic characteristic than the validation subset (i.e. the acoustic characteristic is less audible in the training subset than in the validation subset). In this way, the speech signal within each data sample in the training subset may be preserved.

The pre-trained general ML model may be obtained from a data store and/or may be a general model which has been trained to full precision by the server on data which is accessible by the server. The general ML model in the form of a neural network comprising a plurality of layers with each layer having a set of general weights. The personalised local model may be a similar model with each layer having a set of personalised weights. The retraining or updating of the general ML model may be done using any standard training technique.

The set of user data samples may be characterised by more than one distribution, including for example at least one distribution of user acoustic characteristics p(spk), at least one distribution of semantic and syntactic characteristics p(s) and/or at least one distribution of acoustic environment characteristics p(env). The method may thus further comprise analysing a plurality of distributions of the set of user data samples, wherein each one of the plurality of distributions is analysed with respect to one of a plurality of acoustic characteristics; and determining, using each respective data distribution, whether data augmentation for an acoustic characteristic corresponding to the respective data distribution is to be applied. The or each acoustic characteristic may be an environmental characteristic, such as noise, signal to noise ratio or reverberation; a user acoustic characteristic; a semantic characteristic; or a syntactic characteristic.

When it is determined that one or more data augmentation techniques are to be applied, each data augmentation may be applied in parallel. In other words, each of the data augmentation techniques may be applied separately to each data sample in the training subset to create multiple, differently augmented samples. Each augmented data sample may then be saved separately in the database for the retraining step. For example, a data sample may be augmented to include reverberation to give the impression of being recorded in a church and may separately be augmented to include noise to give the impression of being recorded on a train. By contrast, if each data augmentation was applied sequentially to a data sample, a single data augmented sample would be generated.

Analysing a distribution of the set of user data samples with respect to a data augmentation parameter may comprise plotting a probability distribution $P(\theta|X)$ for a data augmentation parameter $\theta$ in the user dataset X. The probability distribution may be plotted using any standard technique. For example, one simple technique for plotting the probability distribution may be to compute an estimated value for the acoustic characteristic (e.g. signal to noise ratio) for each data sample and to plot a histogram of these estimated values. A histogram will show the ranges of the most common values for the acoustic characteristic. Alternatively, kernel density estimation may be used once the estimated values are computed.

Determining, using the data distribution, whether data augmentation is to be applied, may comprise selecting data augmentation parameters $\theta$ which maximise a probability of generating similar acoustic characteristics in the set of user data samples. In other words, the problem may be formulated as:

$$\arg\max_{\theta} P(\theta|spk, s, env)$$

where spk denotes the user acoustic characteristics observed in the data, s denotes the semantic and syntactic characteristics observed in the data and env denotes the acoustic environment characteristics observed in the data. Alternatively, when focusing only on environment acoustic characteristics, the problem may be formulated as:

$$\arg\max_{\theta} P(\theta|E)$$

where E denotes the acoustic environment characteristics observed in the data. These optimization problems can be solved using traditional optimization algorithms, classical machine learning methods such as maximum likelihood estimators and deep learning methods.

Determining, using the or each data distribution, whether data augmentation is to be applied, may comprise setting personalised settings for one or more data augmentation parameters, wherein each data augmentation parameter corresponds to an acoustic characteristic. The personalised settings may comprise any suitable statistical value computed from the distribution, including mean, variance, and lower and upper values (percentiles) within the corresponding data distribution. The value of at least one of the personalised settings of the distribution may then be compared to a threshold; and when the value of the personalised setting meets the threshold, it is determined that data augmentation is to be applied. For example, the acoustic parameter may be signal to noise ratio (SNR) and the personalised settings may comprise lower and upper values $\{\theta_L, \theta_H\}$ which define the most likely range of SNRs in the user dataset. When the lower value $\{\theta_L\}$ for a distribution calculated for a set of user data samples is compared to an SNR threshold and is higher than the SNR threshold, the data augmentation may be disabled because the user data $\{X\}$ can be considered to be essentially noiseless. In other words, the lowest value of the distribution is higher than the threshold and so the data augmentation is switched off. By contrast, if the calculated lower value $\{\theta_L\}$ is equal to or lower than the SNR threshold, the data augmentation may be enabled. The threshold may be personalised to the set of user data samples and may be derived from the or each distribution. For example, a higher SNR threshold may be set for a user who has a set of user samples recorded on a train than for a user who has a set of user samples recorded in a car, because the level of noise is likely to be higher in the first example.

Applying data augmentation may be done using standard data augmentation techniques. Data augmentation may be applied by using flags to enable or disable the corresponding data augmentation technique. Examples of data augmentation techniques include vocal tract perturbation (VTLP), aligned data augmentation (AD) and multi-condition training (MCT). The data augmentation itself may be further personalised as described below. For environmental characteristics, applying data augmentation may comprise adding a signal which mimics the environment, e.g. a noise signal or a reverberant signal, to the user data sample. For user acoustic characteristics, applying data augmentation may comprise transforming the user data sample to match the desired user acoustic characteristic, e.g. so that a vocal tract length is shorter or longer. For semantic and syntactic characteristics, applying data augmentation may comprise merging user data samples.

The personalised settings may be used to personalise the data augmentation. For example, when the personalised settings are statistical values, such as upper and lower values, the data augmentation may comprise generating a signal (or information) having an acoustic characteristic with a matching statistic value, e.g. within a range defined by the upper and lower values. This generated signal is then added when applying the data augmentation. In other words, the personalised settings may be used to determine whether or not to apply the data augmentation and when the data augmentation is to be applied, the personalised setting may be further used to configure the data augmentation. The data augmentation is personalised in two different but complementary ways.

The method may further comprise generating the data augmentation which is to be applied from or based on the validation subset. The generated data augmentation may be stored in a personal dataset. The generation of the signal which is to be applied during data augmentation may be done as a separate type of personalisation.

According to an embodiment of the disclosure, there is a computer-implemented method for generating, on a user device, a local machine learning, ML, model which is personalised to one or more users of the user device, the method comprising: obtaining a pre-trained automatic speech recognition model; obtaining a set of user data samples which comprise audio data for the or each user to which the model is to be personalised; dividing the set of user data samples into a training subset and a validation subset, based on an acoustic characteristic being less audible in the training subset than in the validation subset; obtaining, using at least one data sample in the validation subset, a signal which matches the acoustic characteristic of the at least one data sample; applying the data augmentation to add the obtained signal to each user data sample in the training subset; and updating the pre-trained ASR model with the augmented training subset to generate the personalised local ML model. The techniques described above apply equally to this second aspect.

The following techniques apply to both aspects.

For example, the data augmentation may comprise adding a noise signal. The data augmentation may be generated by extracting noisy audio frames from the validation data, concatenating consecutive noise frames to form noise segments and then concatenating noise segments until a noise recording or signal which is longer than the longest data sample in the training subset is created. The noise segments may be compared to a length threshold before concatenating and when longer than the length threshold, the noise segments may be concatenated to form the noise signals which can be added when applying the data augmentation. There may be normalization before concatenation. Linear cross-fading may be applied at the boundaries of concatenated frames and/or segments. The noise recordings may be stored in a personal noise dataset which may be added to the training subset in the data augmentation. As an alternative to generating the noise recordings, the method may comprise extracting background noise signals using a speech separation model.

As another example, the data augmentation may comprise adding a reverberation signal. The method comprises estimating the reverberation in each data sample of the validation subset. The reverberation may be estimated using any suitable technique, e.g. using the reverberation time T60 which is defined as the time needed for the sound pressure level in the room to drop 60 dB after the acoustic excitation cease. Once the level of reverberation is estimated, a Room Impulse Responses (RIR) with the closest T60 is drawn from the generic RIR database. The selected RIR may then be stored in a personal dataset. A room impulse response may be defined as a room's response to an impulse, e.g. a short, loud signal which is used to excite the room.

As an alternative to generating the data augmentation to be added from the user data, personalised settings for the data augmentation may be derived using the user data. For example, the noise recordings generated above may be analysed so that similar noise signals may be retrieved from a generic noise dataset.

The method described above may be carried out on a user device to provide on-device personalisation. The set of local data samples may be stored in a database on the user device and hence obtained from the database on the user device when carrying out the steps of the method on a user device. This helps ensure privacy of the user data. Alternatively, the set of local data samples may be obtained from a remote depository, e.g. from the cloud or from a server.

Alternatively, the method described above may be carried out on the server (or other device) which has trained the general ML model and is remote from the user device on which the personalised model is to be used. In this case, the set of local data samples may be obtained from the user device. The communication bandwidth required to transmit the set of local data sample may be smaller than the bandwidth required to transfer the general ML model from the server to the user device.

Regardless of whether the method is carried out on the user device or the server, the local data samples are typically unlabelled which further enhances privacy. The set of local data samples may be a relatively small dataset (for example fewer than 32 samples).

According to an embodiment of the disclosure, there is provided a computer-implemented method for applying the personalized machine learning model to a new input received by the user device. The method may comprise obtaining, at the user device, input speech; processing the input speech using the personalised model generated as described above to determine a command from a user and implementing the command on the user device. Alternatively, the processing may generate a text output from the input speech.

According to an embodiment of the disclosure, there is provided a computer-readable storage medium comprising instructions which, when executed by a processor, causes the processor to carry out any of the methods described herein.

As will be appreciated by one skilled in the art, the disclosure may be embodied as a system, method or computer program product. Accordingly, the disclosure may take the form of an entirely hardware embodiment, an entirely software embodiment, or an embodiment combining software and hardware aspects.

According to an embodiment of the disclosure, there is provided a system for customising a machine learning model, the system comprising: a server comprising: a processor for training a general machine learning model to learn a set of general parameters (or weights); and an electronic user device comprising: memory for storing a local ML machine derived from the general machine learning model which is received from the server, and at least one processor coupled to memory. The processor is arranged to receive at least one training set comprising a plurality of training samples. The processor may be further arranged (or configured) to carry out any of the steps of the method described above to personalise the general ML model.

Furthermore, the disclosure may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the disclosure may be written in any combination of one or more programming languages, including object-oriented programming languages and conventional procedural programming languages. Code components may be embodied as procedures, methods or the like, and may comprise subcomponents which may take the form of instructions or sequences of instructions at any of the levels of abstraction, from the direct machine instructions of a native instruction set to high-level compiled or interpreted language constructs.

Embodiments of the disclosure also provide a non-transitory data carrier carrying code which, when implemented on a processor, causes the processor to carry out any of the methods described herein.

The disclosure further provide processor control code to implement the above-described methods, for example on a general-purpose computer system or on a digital signal processor (DSP). The disclosure also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the disclosure described herein may comprise source, object or executable code in a conventional programming language (interpreted or compiled) such as Python, C, or assembly code, code for setting up or controlling an ASIC (Application Specific Integrated Circuit) or FPGA (Field Programmable Gate Array), or code for a hardware description language such as Verilog® or VHDL (Very high speed integrated circuit Hardware Description Language). As the skilled person will appreciate, such code and/or data may be distributed between a plurality of coupled components in communication with one another. The disclosure may comprise a controller which includes a microprocessor, working memory and program memory coupled to one or more of the components of the system.

It will also be clear to one of skill in the art that all or part of a logical method according to embodiments of the disclosure may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment of the disclosure, the disclosure may be realised in the form of a data carrier having functional data thereon, said functional data comprising functional computer data structures to, when loaded into a computer system or network and operated upon thereby, enable said computer system to perform all the steps of the above-described method.

The methods described above may be wholly or partly performed on an apparatus, i.e., an electronic device, using a machine learning or artificial intelligence model. The model may be processed by an artificial intelligence-dedicated processor designed in a hardware structure specified for artificial intelligence model processing. The artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training algorithm. The artificial intelligence model may include a plurality of neural network layers. Each of the plurality of neural network layers includes a plurality of weight values and performs neural network computation by computation between a result of computation by a previous layer and the plurality of weight values.

As mentioned above, the disclosure may be implemented using an AI model. A function associated with AI may be performed through the non-volatile memory, the volatile memory, and the processor. The processor may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning. Here, being provided through learning means that, by applying a learning algorithm to a plurality of learning data, a predefined operating rule or AI model of a desired characteristic is made. The learning may be performed in a device itself in which AI according to an embodiment of the disclosure is performed, and/or may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

In an embodiment of the disclosure, wherein the applying of the data augmentation comprises applying the data augmentation to add the acoustic characteristic to the user data in the training subset in parallel.

In an embodiment of the disclosure, wherein the acoustic characteristic is selected from environmental acoustic characteristics, user acoustic characteristics, and semantic and syntactic characteristics, wherein the environmental acoustic characteristics includes noise, signal to noise ratio and reverberation, wherein the user acoustic characteristics includes speed and spectral characteristics, and wherein the semantic and syntactic characteristics includes meaning and structure of a text uttered by the user.

In an embodiment of the disclosure, wherein the analysing of the distribution of the user data with respect to an acoustic characteristic comprises plotting a probability distribution for the user dataset for the acoustic characteristic.

In an embodiment of the disclosure, wherein the determining, using the distribution, whether the data augmentation is to be applied, comprises selecting data augmentation parameters which maximise a probability of generating similar acoustic characteristics in the user data.

In an embodiment of the disclosure, wherein the determining, using the distribution, whether the data augmentation is to be applied, comprises: setting personalised settings, for the user, for a data augmentation parameter which corresponds to the acoustic characteristic, wherein the personalised settings comprise at least one statistical value calculated from the corresponding distribution.

In an embodiment of the disclosure, the method comprising: comparing a value of at least one of the personalised settings determined from the corresponding distribution to a threshold; and when the value of the at least one of the personalised settings meets the threshold, determining that the data augmentation is to be applied.

In an embodiment of the disclosure, the method comprising: generating a signal having an acoustic characteristic which matches values of the at least one of the personalised settings determined from the corresponding distribution; and adding the generated signal when applying the data augmentation.

In an embodiment of the disclosure, the method comprising: obtaining, using at least one user data in the validation subset, a signal which matches the acoustic characteristic of the least one data; and applying the data augmentation to add the obtained signal to user data in the training subset.

In an embodiment of the disclosure, the method comprising: generating a noise signal to be applied the data augmentation, wherein the applying of the data augmentation comprises adding the noise signal.

In an embodiment of the disclosure, wherein the generating of the noise signal comprises: extracting noise frames which are individual audio frames in the validation data containing noise; concatenating consecutive noise frames to form multiple noise segments; and concatenating a subset of the noise segments to form a noise signal which is longer than the user data in the training subset.

In an embodiment of the disclosure, the method comprising: comparing each of the multiple noise segments to a length threshold; and rejecting at least one noise segment which are shorter than the length threshold.

In an embodiment of the disclosure, the method comprising: retrieving a noise signal which is similar to the generated noise signal from a generic noise dataset; and adding the retrieved noise signal when applying data augmentation.

In an embodiment of the disclosure, wherein the generating of the noise signal to be applied the data augmentation comprises generating the noise signal to be applied by extracting background noise using a speech separation model.

In an embodiment of the disclosure, wherein the applying of the data augmentation comprises applying a reverberation signal.

In an embodiment of the disclosure, the method comprising: estimating a value of reverberation in the user data of the validation subset; selecting the reverberation signal in a form of a room impulse response (RIR) with a matching value of reverberation; and storing the selected RIR in a personal dataset for the user.

In an embodiment of the disclosure, the method comprising: obtaining, at the user device, input speech; processing the input speech using the personalised local ML model to determine a voice command from the user; and implementing the voice command on the user device to enable voice-based control of the user device.

In an embodiment of the disclosure, wherein the at least one processor is configured to execute the one or more instructions to: obtain, using at least one user data in the validation subset, a signal which matches the acoustic characteristic of the least one data; and apply the data augmentation to add the obtained signal to user data in the training subset.

Thus in summary, according to one example, we describe a method to enable personalized data augmentation approaches given the on-device user dataset. According to another example or in combination with the previous example, we describe a method to enable personalized data augmentation settings given the on-device user dataset. According to another example, we describe a method to use non-speech (e.g. noise and/or background data) recordings from user's data to enable the personalized data augmentation approaches and/or settings. We also describe using personalised data augmentation to support distributed and federated training.

The key benefits of the approaches include personalisation by augmenting on-device data for training without diverging from the user's data distribution; privacy when training on the device because the data is kept on-device and efficiency. This final benefit may be achieved because the method selects which augmentation techniques are required to be employed from a set of techniques. This allows only a subset of techniques to be applied rather than use them all. Nevertheless, the local model is adapted to the user's speaker characteristics and get better at understanding the user, leading to fewer corrections and a more seamless mobile experience. On-device personalisation also leads to lower server cost.

According to another example, we accommodate a user's noise acoustic environment characteristics. This method uses non-speech (noise and background) recordings from users for personalised data augmentation. As explained above, a voice activity detector is used to extract noise segments. These noise segments are then concatenated and used to mix the noise with other utterances. In an example pipeline, data is collected from a user and stored in an on-device user dataset. The voice activity detector creates a list of personalised noises. The signal to noise estimator filters and removes low SNR (noisy audio) for augmentation and thus uses high SNR data for personalised data augmentation. More data augmentation approaches can be used in conjunction with non-audio speech information.

The disclosure focuses on ASR models but can be applied to any other model and task.

Those skilled in the art will appreciate that while the foregoing has described what is considered to be the best mode and where appropriate other modes of performing techniques, the disclosure should not be limited to the specific configurations and methods disclosed in this description of the preferred embodiment. Those skilled in the art will recognise that the disclosure have a broad range of applications, and that the embodiments may take a wide range of modifications without departing from any inventive concept as defined in the appended claims.

Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method, performed by a user device, for generating a local machine learning (ML) model which is personalised to a user of the user device, the method comprising:
obtaining a pre-trained automatic speech recognition (ASR) model;
obtaining a user data from a user database;
analysing a distribution of the user data with respect to an acoustic characteristic;
determining, using the distribution, whether data augmentation for the acoustic characteristic is to be applied;
when it is determined that data augmentation is to be applied, dividing the user data into a training subset and a validation subset, wherein the acoustic characteristic is less audible in the training subset than in the validation subset;
applying data augmentation to add the acoustic characteristic to the training subset; and
updating the pre-trained ASR model with the augmented training subset to generate a personalised local ML model.

2. The method of claim 1, wherein the applying of the data augmentation comprises applying the data augmentation to add the acoustic characteristic to the training subset in parallel.

3. The method of claim 1,
wherein the acoustic characteristic is selected from environmental acoustic characteristics, user acoustic characteristics, and semantic and syntactic characteristics,
wherein the environmental acoustic characteristics includes noise, signal to noise ratio and reverberation,
wherein the user acoustic characteristics includes speed and spectral characteristics, and
wherein the semantic and syntactic characteristics includes meaning and structure of a text uttered by the user.

4. The method of claim 1, wherein the analysing of the distribution of the user data with respect to an acoustic characteristic comprises plotting a probability distribution $P(\theta|X)$ for user dataset X for acoustic characteristic $\theta$.

5. The method of claim 1, wherein the determining, using the distribution, whether the data augmentation is to be applied, comprises selecting data augmentation parameters which maximise a probability of generating similar acoustic characteristics in the user data.

6. The method of claim 1,
wherein the determining, using the distribution, whether the data augmentation is to be applied, comprises:
setting personalised settings, for the user, for a data augmentation parameter which corresponds to the acoustic characteristic, and
wherein the personalised settings comprise at least one statistical value calculated from the corresponding distribution.

7. The method of claim 6, further comprising:
comparing a value of at least one of the personalised settings determined from the corresponding distribution to a threshold; and
when the value of the at least one of the personalised settings meets the threshold, determining that the data augmentation is to be applied.

8. The method of claim 7, further comprising:
generating a signal having an acoustic characteristic which matches values of the at least one of the personalised settings determined from the corresponding distribution; and
adding the generated signal when applying the data augmentation.

9. The method of claim 1, further comprising:

obtaining, using at least one user data in the validation subset, a signal which matches the acoustic characteristic of the at least one user data; and applying the data augmentation to add the obtained signal to user data in the training subset.

10. The method of claim 9, further comprising:

generating a noise signal to be applied the data augmentation, wherein the applying of the data augmentation comprises adding the noise signal.

11. The method of claim 10, wherein the generating of the noise signal comprises:

extracting noise frames which are individual audio frames in the validation subset containing noise;

concatenating consecutive noise frames to form multiple noise segments; and concatenating a subset of the noise segments to form a noise signal which is longer than the training subset.

12. The method of claim 11, further comprising:

comparing each of the multiple noise segments to a length threshold; and rejecting at least one noise segment which are shorter than the length threshold.

13. The method of claim 10, further comprising:

retrieving a noise signal which is similar to the generated noise signal from a generic noise dataset; and adding the retrieved noise signal when applying data augmentation.

14. The method of claim 10, wherein the generating of the noise signal to be applied the data augmentation comprises generating the noise signal to be applied by extracting background noise using a speech separation model.

15. The method of claim 9, wherein the applying of the data augmentation comprises applying a reverberation signal.

16. The method of claim 15, further comprising:

estimating a value of reverberation in the user data of the validation subset;

selecting the reverberation signal in a form of a room impulse response (RIR) with a matching value of reverberation; and storing the selected reverberation signal in a personal dataset for the user.

17. The method of claim 1, further comprising:

obtaining, at the user device, input speech;

processing the input speech using the personalised local ML model to determine a voice command from the user; and implementing the voice command on the user device to enable voice-based control of the user device.

18. A user device comprising:

a memory storing one or more instructions; and at least one processor configured to execute the one or more instructions to:

obtain a pre-trained automatic speech recognition (ASR) model, obtain a user data from a user database, analyse a distribution of the user data with respect to an acoustic characteristic, determine, using the distribution, whether data augmentation for the acoustic characteristic is to be applied, when it is determined that data augmentation is to be applied, divide the user data into a training subset and a validation subset, based on an acoustic characteristic being less audible in the training subset than in the validation subset, apply data augmentation to add the acoustic characteristic in the training subset, and update the pre-trained ASR model with the augmented training subset to generate a personalised local machine learning (ML) model.

19. The user device of claim 18, wherein the at least one processor is further configured to execute the one or more instructions to:

obtain, using at least one user data in the validation subset, a signal which matches the acoustic characteristic of the at least one user data, and apply the data augmentation to add the obtained signal to user data in the training subset.

20. A non-transitory data carrier carrying code which, when implemented on a processor of a user device, causes the user device to perform operations, the operations comprising:

obtaining a pre-trained automatic speech recognition (ASR) model;

obtaining a user data from a user database;

analysing a distribution of the user data with respect to an acoustic characteristic;

determining, using the distribution, whether data augmentation for the acoustic characteristic is to be applied;

when it is determined that data augmentation is to be applied, dividing the user data into a training subset and a validation subset, wherein the acoustic characteristic is less audible in the training subset than in the validation subset;

applying data augmentation to add the acoustic characteristic to the training subset; and updating the pre-trained ASR model with the augmented training subset to generate a personalised local machine learning (ML) model.

\* \* \* \* \*